(12) United States Patent
Suzuki et al.

(10) Patent No.: US 9,438,066 B2
(45) Date of Patent: Sep. 6, 2016

(54) CONTACTLESS RECHARGEABLE SECONDARY BATTERY AND CONTACTLESS BATTERY CHARGER

(75) Inventors: Tetsuya Suzuki, Tokyo (JP); Hidetaka Yoshihashi, Tokyo (JP); Hirohito Teraoka, Takasaki (JP); Yutaka Toga, Takasaki (JP); Katsuki Tsuchiya, Takasaki (JP)

(73) Assignee: FDK CORPORATION, Minato-ku, Tokyo (JP)

( * ) Notice: Subject to any disclaimer, the term of this patent is extended or adjusted under 35 U.S.C. 154(b) by 175 days.

(21) Appl. No.: 14/236,060

(22) PCT Filed: Jul. 20, 2012

(86) PCT No.: PCT/JP2012/068451

§ 371 (c)(1),
(2), (4) Date: Jan. 29, 2014

(87) PCT Pub. No.: WO2013/021801

PCT Pub. Date: Feb. 14, 2013

(65) Prior Publication Data

US 2014/0176067 A1   Jun. 26, 2014

(30) Foreign Application Priority Data

Aug. 9, 2011   (JP) .................................. 2011-174244

(51) Int. Cl.
*H02J 7/00*   (2006.01)
*H02J 7/02*   (2016.01)
(Continued)

(52) U.S. Cl.
CPC ............ *H02J 7/025* (2013.01); *H01F 27/2804* (2013.01); *H01F 27/36* (2013.01); *H01F 38/14* (2013.01); *H01M 10/46* (2013.01); *H02J 7/0045* (2013.01)

(58) Field of Classification Search
USPC .................. 320/106, 107, 108, 115, 154
See application file for complete search history.

(56) References Cited

U.S. PATENT DOCUMENTS 7,388,350 B1 *  6/2008  Wright ................... G08C 17/02
                                                                320/107
7,741,734 B2   6/2010  Joannopoulos et al.
(Continued)

FOREIGN PATENT DOCUMENTS

CN           2852415 Y       12/2006
JP        2004-312888 A      11/2004
(Continued)

OTHER PUBLICATIONS

International Search Report for PCT/JP2012/068451, dated Sep. 18, 2012.
(Continued)

*Primary Examiner* — Brian Ngo
(74) *Attorney, Agent, or Firm* — Marshall, Gerstein & Borun LLP

(57) ABSTRACT

A contactless rechargeable alkaline secondary battery includes an alkaline secondary battery; a power receiver circuit having receiver coils and a resonance capacitor and adapted to receive AC power via magnetic field resonance, the resonance capacitor connected with the receiver coils L1 to L4; a rectifier circuit adapted to rectify the AC power; a current limiter circuit adapted to limit a charging current flowing from the rectifier circuit to the alkaline secondary battery; and an outer casing configured to be cylindrical in shape, adapted to house the alkaline secondary battery, and provided with a positive terminal and a negative terminal, the positive terminal being connected with a positive pole of the alkaline secondary battery and the negative terminal being connected with a negative pole of the alkaline secondary battery, wherein the power receiver coils are shaped like a sheet of an electric wire wound along a plane.

26 Claims, 25 Drawing Sheets

(51) Int. Cl.
   *H01M 10/46*   (2006.01)
   *H01F 27/28*   (2006.01)
   *H01F 27/36*   (2006.01)
   *H01F 38/14*   (2006.01)

(56) References Cited

U.S. PATENT DOCUMENTS

| | | | |
|---|---|---|---|
| 7,825,543 B2 | 11/2010 | Karalis et al. | |
| 8,310,201 B1* | 11/2012 | Wright | G08C 17/02 320/107 |
| 2004/0067411 A1* | 4/2004 | Lisanke | H02J 7/025 429/90 |
| 2006/0152190 A1* | 7/2006 | Riemschneider | G01R 31/3648 320/106 |
| 2008/0298100 A1* | 12/2008 | Esaka | H01F 38/14 363/67 |
| 2009/0058361 A1* | 3/2009 | John | A61N 1/3785 320/128 |
| 2011/0023130 A1* | 1/2011 | Gudgel | H01M 6/06 726/28 |
| 2011/0031821 A1* | 2/2011 | Greene | H01M 2/1022 307/154 |
| 2011/0109263 A1* | 5/2011 | Sakoda | B60L 11/182 320/108 |
| 2011/0127954 A1* | 6/2011 | Walley | H01M 2/0267 320/108 |

FOREIGN PATENT DOCUMENTS

| | | |
|---|---|---|
| JP | 2005-117748 A | 4/2005 |
| JP | 2005-124324 A | 5/2005 |
| JP | 2009-501510 A | 1/2009 |
| JP | 2009-530964 A | 8/2009 |
| JP | 2010-119193 A | 5/2010 |
| JP | 2010-193701 A | 9/2010 |
| JP | 2011-030294 A | 2/2011 |
| JP | 2011-045189 A | 3/2011 |
| JP | 2011-045236 A | 3/2011 |
| JP | 2011-060677 A | 3/2011 |

OTHER PUBLICATIONS

Written Opinion for PCT/JP2012/068451, dated Sep. 18, 2012.
Office Action for CN 201280049466.X, dated Aug. 5, 2015.

* cited by examiner

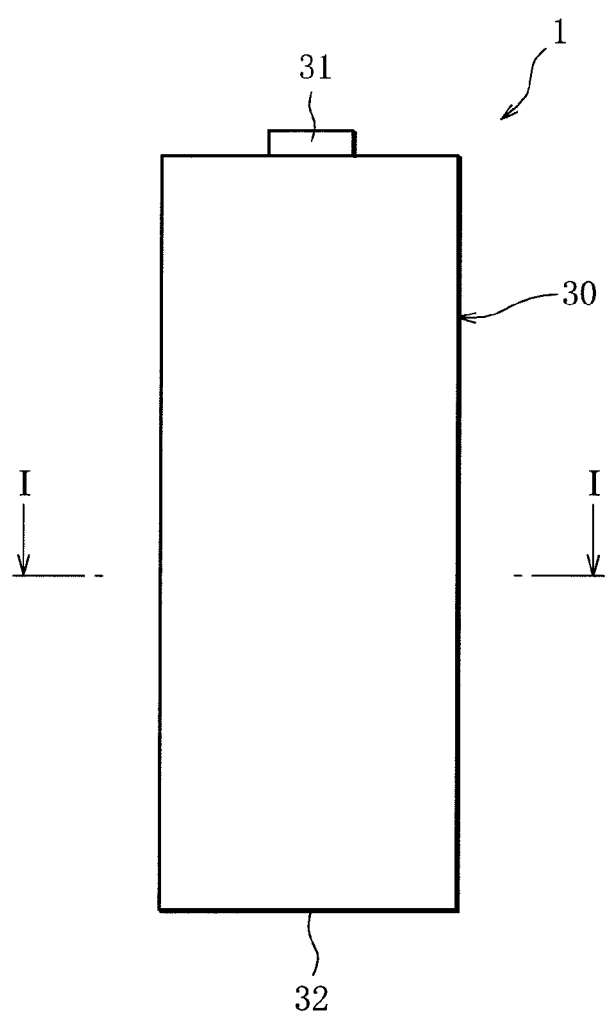

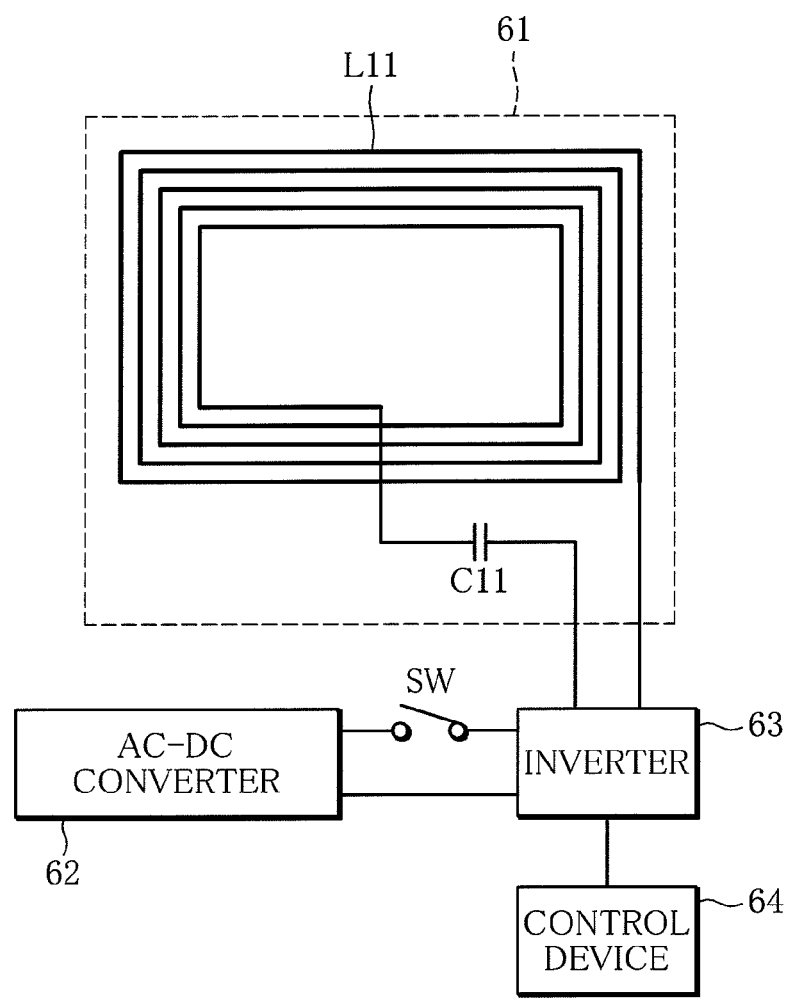

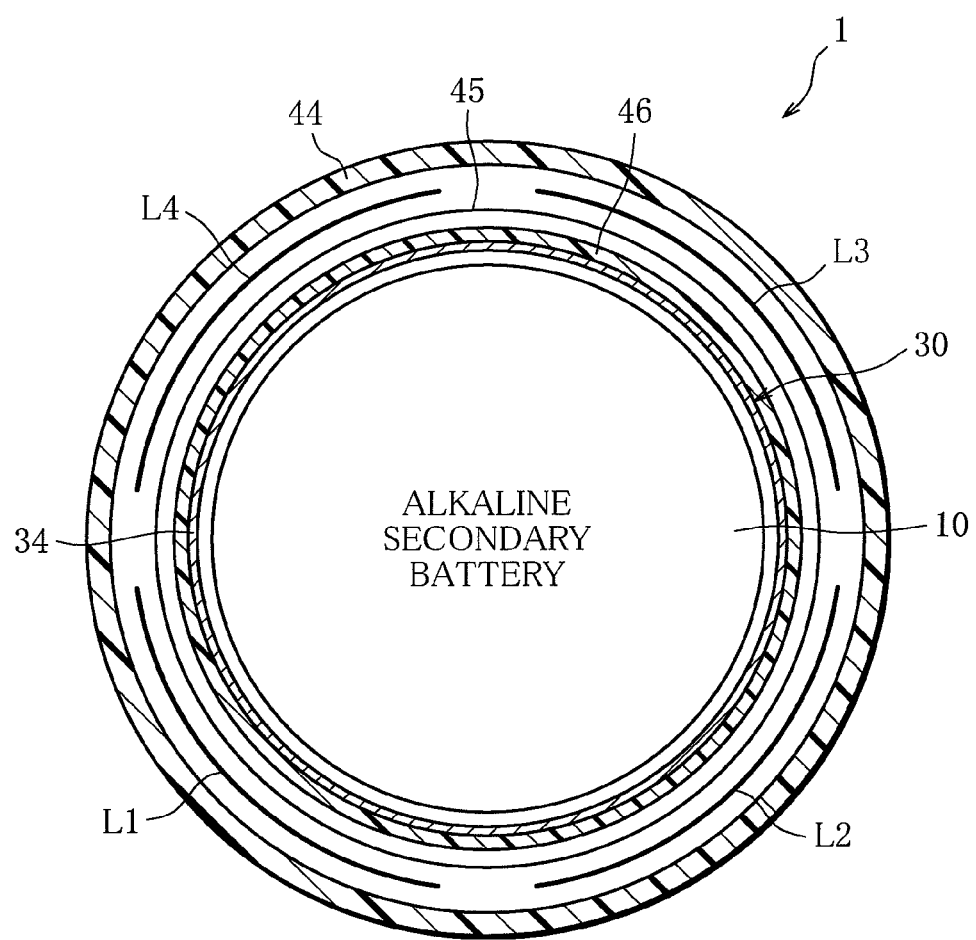

CONTACTLESS RECHARGEABLE SECONDARY BATTERY AND CONTACTLESS BATTERY CHARGER

TECHNICAL FIELD

The present invention relates to a contactless rechargeable secondary battery, which is an alkaline secondary battery interchangeable with a dry battery and chargeable in a contactless manner, as well as to a contactless battery charger adapted to charge the contactless rechargeable secondary battery by transmitting electric power thereto in a contactless manner.

BACKGROUND ART

Secondary batteries, such as alkaline secondary batteries, equal in size and output voltage to dry batteries (primary batteries prescribed by IEC60086 (JISC8500)) and interchangeable with the dry batteries have been spreading widely due to the recent growing trend toward global environmental protection. Examples of known charging techniques for secondary batteries include a technique which uses a contactless power transmission technique. Examples of known conventional techniques for charging secondary batteries interchangeable with dry batteries using the contactless power transmission technique include an electromagnetic induction method (see, for example, Patent Literatures 1 to 5).

However, the contactless power transmission by electromagnetic induction method is capable of transmitting electric power over a very short distance and is liable to suffer a significant drop in power transmission efficiency if there is even a slight shift in positional relationship between a power transmitter-side coil and power receiver-side coil. This makes it necessary to establish the positional relationship accurately, presenting a problem in terms of convenience. Also, the contactless power transmission by electromagnetic induction method has a problem in terms of safety because any metal object lying on a power transmission path will be heated by induction heating.

Consequently, contactless power transmission techniques based on a magnetic field resonance method have been attracting attention in recent years (see, for example, Patent Literatures 6 to 10). The magnetic field resonance method, which is entirely different from the electromagnetic induction method, uses magnetic field resonance whereby oscillation of a magnetic field generated when an electric current flows through a power transmitter-side coil is transmitted to a receiver-side resonance circuit oscillating at the same frequency. Contactless power transmission by magnetic field resonance method is capable of transmitting electric power over a longer distance than the electromagnetic induction method, and is almost free of decrease in power transmission efficiency even if there is some shift in positional relationship between the power transmitter-side coil and power receiver-side coil, and is thus quite advantageous in terms of convenience. Also, the contactless power transmission by magnetic field resonance method uses a smaller magnetic field than the magnetic induction method and allows only resonance circuits of a specific resonance frequency to receive power, and thus develops little induction heat. Also, objects to be charged can be selected according to resonance frequency. Furthermore, whereas the power transmitter side and power receiver side are in a one-to-one relationship in the case of the magnetic induction method, the magnetic field resonance method allows a single power transmission coil to transmit electric power to plural power receiver coils. Thus, the magnetic field resonance method is quite advantageous in terms of convenience in this respect as well.

CITATION LIST

Patent Literature

Patent Literature 1: Japanese Patent Laid-Open No. 2005-117748
Patent Literature 2: Japanese Patent Laid-Open No. 2005-124324
Patent Literature 3: Japanese Patent Laid-Open No. 2010-193701
Patent Literature 4: Japanese Patent Laid-Open No. 2011-45236
Patent Literature 5: Japanese Patent Laid-Open No. 2011-60677
Patent Literature 6: U.S. Pat. No. 7,741,734
Patent Literature 7: U.S. Pat. No. 7,825,543
Patent Literature 8: National Publication of International Patent No. 2009-501510
Patent Literature 9: Japanese Patent Laid-Open No. 2010-119193
Patent Literature 10: Japanese Patent Laid-Open No. 2011-30294

SUMMARY OF INVENTION

Technical Problem

However, as far as the applicant knows, there is no conventional technique which adopts contactless power transmission by magnetic field resonance method for contactless rechargeable secondary batteries interchangeable with dry batteries.

In addition to the above-mentioned problems in terms of convenience and safety, the contactless power transmission by electromagnetic induction method has a problem in that the number of coil turns has to be increased to or above a predetermined number in order to implement practical power transmission. Furthermore, contactless rechargeable secondary batteries interchangeable with dry batteries have to satisfy shapes and sizes prescribed by standards (IEC60086 (JISC8500)) and secure battery capacity equal to or higher than a predetermined level. Therefore, when contactless power transmission by electromagnetic induction method is adopted in a contactless rechargeable secondary battery interchangeable with a dry battery, the coil has to be wound in a winding direction around an axis of the secondary battery from the standpoint of mounting efficiency as disclosed in Patent Literatures 1 to 5.

Also, with contactless power transmission by electromagnetic induction method, the positional relationship between the power transmitter-side coil and power receiver-side coil needs to be established accurately at the time of charging as described above. Thus, when contactless power transmission by electromagnetic induction method is adopted in a contactless rechargeable secondary battery interchangeable with a dry battery, due to constraints on the winding direction of the coil on the side of the secondary battery, structure of a contactless battery charger is also limited to an extremely narrow range as disclosed in Patent Literatures 1 to 4.

For example, a contactless battery charger disclosed in Patent Literature 1 or 2 includes a cylindrical battery housing containing a power transmission coil, and needs to house secondary batteries in standing positions in the cylindrical battery container. Also, for example, in a contactless battery charger disclosed in Patent Literature 3 or 4, plural recesses with power transmission coils buried in bottom surfaces thereof are arranged side by side in an enclosure and secondary batteries need to be placed one by one in respective ones of the plural recesses, being arranged side by side. That is, the conventional techniques disclosed in Patent Literatures 1 to 4 make the handling of the secondary batteries at the time of charging still troublesome and allow only a small number of secondary batteries to be charged simultaneously, failing to take full advantage of contactless charging, and thus still have a problem in terms of convenience.

The present invention has been made in view of the above circumstances and has an object to implement a more convenient contactless rechargeable secondary battery and contactless battery charger.

Solution to Problem

<First Aspect of the Present Invention>

A first aspect of the present invention is a contactless rechargeable secondary battery comprising: a secondary battery; a power receiver circuit provided with a power receiver coil and a resonance capacitor and adapted to receive AC power of resonance frequency via magnetic field resonance, the resonance capacitor being connected in parallel with the power receiver coil; a rectifier circuit adapted to rectify the AC power received by the power receiver circuit; a current limiter circuit adapted to limit a charging current flowing from the rectifier circuit to the secondary battery; and an outer casing configured to be cylindrical in shape, adapted to house the secondary battery, and provided with a positive terminal and a negative terminal, the positive terminal being connected with a positive pole of the secondary battery and the negative terminal being connected with a negative pole of the secondary battery, wherein the power receiver coil is shaped like a sheet by being made up of an electric wire wound along a plane and is installed along an inner surface of the outer casing.

The power receiver coil is a so-called flat coil shaped like a sheet by being made up of an electric wire wound along a plane and is installed along the inner surface of the outer casing. Thus, if a power transmission coil of a contactless battery charger is placed facing an outer surface of the outer casing it is possible to create a condition in which the power receiver coil and power transmission coil face each other, i.e., a condition which enables efficient contactless power transmission. That is, the contactless rechargeable secondary battery according to the first aspect of the present invention can efficiently perform contactless power transmission by, for example, simply leaving the contactless rechargeable secondary battery lying down on a placement surface of the contactless battery charger having the power transmission coil shaped like a sheet by being made up of an electric wire wound along a plane installed parallel to the placement surface. Also, the contactless power transmission by magnetic field resonance method is capable of transmitting electric power over a longer distance than the electromagnetic induction method and is almost free of decrease in power transmission efficiency even if there is some shift in positional relationship between a power transmitter-side coil and power receiver-side coil.

Thus, a large number of the contactless rechargeable secondary batteries according to the first aspect of the present invention can be charged simultaneously in a contactless manner by simply being left lying down casually on the placement surface of the contactless battery charger without concern for their orientation and position. That is, the contactless rechargeable secondary battery according to the first aspect of the present invention is very easy to handle at the time of charging, thereby making it possible to achieve high convenience by taking full advantage of contactless charging.

The contactless power transmission by magnetic field resonance method generally uses electromagnetic waves of a higher frequency than the electromagnetic induction method, making it possible to implement practical power transmission using a smaller number of coil turns than the electromagnetic induction method. Therefore, even when the above-described configuration is adopted in which the power receiver coil shaped like a sheet by being made up of an electric wire wound along a plane is installed along an inner surface of the outer casing, there is almost no chance that battery capacity of the secondary battery will be limited by the power receiver coil and sufficient battery capacity can be secured within a range of sizes interchangeable with a dry battery.

Thus, the first aspect of the present invention provides the operational advantage of being able to implement a more convenient contactless rechargeable secondary battery.

<Second Aspect of the Present Invention>

According to a second aspect of the present invention, the contactless rechargeable secondary battery according to the first aspect of the present invention described above further comprises a magnetic layer installed between the secondary battery and the power receiver coil.

This feature can reduce losses caused to the power receiver coil by an eddy current produced on a surface of the secondary battery in the outer casing, making it possible to reduce the chance that the eddy-current losses will decrease power reception efficiency.

<Third Aspect of the Present Invention>

According to a third aspect of the present invention, the contactless rechargeable secondary battery according to the first or second aspect of the present invention described above further comprises an insulating layer installed between the secondary battery and the power receiver coil.

This feature can reduce the chance that power receiver coil will touch a surface of the secondary battery in the outer casing, causing a short-circuit or the like of the power receiver coil.

<Fourth Aspect of the Present Invention>

According to a fourth aspect of the present invention, the contactless rechargeable secondary battery according to any one of the first to third aspects of the present invention described above further comprises an insulating layer installed between the power receiver coil and the inner surface of the outer casing.

This feature can reduce the chance that the power receiver coil will touch the inner surface of the outer casing, causing a short-circuit or the like of the power receiver coil.

<Fifth Aspect of the Present Invention>

A fifth aspect of the present invention is a contactless rechargeable secondary battery comprising: a secondary battery; a power receiver circuit provided with a power receiver coil and a resonance capacitor and adapted to receive AC power of resonance frequency via magnetic field resonance, the resonance capacitor being connected in parallel with the power receiver coil; a rectifier circuit adapted to rectify the AC power received by the power receiver circuit; a current limiter circuit adapted to limit a charging current flowing from the rectifier circuit to the secondary battery; and an outer casing configured to be cylindrical in shape, adapted to house the secondary battery, and provided with a positive terminal and a negative terminal, the positive terminal being connected with a positive pole of the secondary battery and the negative terminal being connected with a negative pole of the secondary battery, wherein the power receiver coil is shaped like a sheet by being made up of an electric wire wound along a plane and is installed along an outer surface of the outer casing.

The fifth aspect of the present invention provides an operational advantage similar to that of the first aspect of the present invention described above.

<Sixth Aspect of the Present Invention>

According to a sixth aspect of the present invention, the contactless rechargeable secondary battery according to the fifth aspect of the present invention described above further comprises a magnetic layer installed between the outer surface of the outer casing and the power receiver coil.

This feature can reduce losses caused to the power receiver coil by an eddy current produced on the outer surface of the outer casing, making it possible to reduce the chance that the eddy-current losses will decrease power reception efficiency.

<Seventh Aspect of the Present Invention>

According to a seventh aspect of the present invention, the contactless rechargeable secondary battery according to the fifth or sixth aspect of the present invention described above further comprises an insulating layer installed between the outer surface of the outer casing and the power receiver coil.

This feature can reduce the chance that the power receiver coil will touch the outer surface of the outer casing, causing a short-circuit or the like of the power receiver coil.

<Eighth Aspect of the Present Invention>

According to an eighth aspect of the present invention, the contactless rechargeable secondary battery according to any one of the fifth to seventh aspects of the present invention described above further comprises an insulating layer adapted to cover an outer side of the power receiver coil.

This feature can reduce the chance that damage, a short-circuit, or the like will be caused to the power receiver coil by some kind of external factor.

<Ninth Aspect of the Present Invention>

A ninth aspect of the present invention is a contactless rechargeable secondary battery comprising: a secondary battery cylindrical in shape; an insulating layer adapted to cover an outer surface of the secondary battery; a power receiver circuit provided with a power receiver coil and a resonance capacitor and adapted to receive AC power of resonance frequency via magnetic field resonance, the power receiver coil being shaped like a sheet by being made up of an electric wire wound along a plane and the resonance capacitor being connected in parallel with the power receiver coil; a rectifier circuit adapted to rectify the AC power received by the power receiver circuit; and a current limiter circuit adapted to limit a charging current flowing from the rectifier circuit to the secondary battery, wherein the power receiver circuit, the rectifier circuit, and the current limiter circuit are installed between the outer surface of the secondary battery and the insulating layer.

The ninth aspect of the present invention provides an operational advantage similar to that of the first aspect of the present invention described above.

<Tenth Aspect of the Present Invention>

According to a tenth aspect of the present invention, the contactless rechargeable secondary battery according to the ninth aspect of the present invention described above further comprises a magnetic layer installed between the outer surface of the secondary battery and the power receiver coil.

This feature can reduce losses caused to the power receiver coil by an eddy current produced on the outer surface of the secondary battery, making it possible to reduce the chance that the eddy-current losses will decrease power reception efficiency.

<Eleventh Aspect of the Present Invention>

According to an eleventh aspect of the present invention, in the contactless rechargeable secondary battery according to any one of the first to tenth aspects of the present invention described above, a center of gravity is eccentric to an axis of the outer casing.

With this feature, when, for example, the contactless rechargeable secondary battery is left lying down on a placement surface of the contactless battery charger having a power transmission coil shaped like a sheet by being made up of an electric wire wound along a plane installed parallel to the placement surface, the positional relationship between the power transmission coil and power receiver coil always remains constant according to an eccentricity direction of the center of gravity. Thus, in this state, if the power receiver coil is placed relative to the eccentricity direction of the center of gravity such that the positional relationship between the power transmission coil and power receiver coil will maximize power transmission efficiency, contactless charging can always be done with high power transmission efficiency.

<Twelfth Aspect of the Present Invention>

According to a twelfth aspect of the present invention, in the contactless rechargeable secondary battery according to any one of the first to eleventh aspects of the present invention described above, the rectifier circuit is a half-wave rectifier circuit.

By the adoption of the half-wave rectifier circuit smaller in the number of circuit elements than a full-wave rectifier circuit, this feature allows manufacturing costs to be reduced greatly. In particular, a half-wave rectifier circuit made up of only a single rectifier diode has a marked effect of reducing the manufacturing costs. Also, the adoption of the half-wave rectifier circuit smaller in the number of circuit elements than a full-wave rectifier circuit allows voltage drops in the rectifier circuit to be reduced. This makes it possible to mitigate reductions in charge efficiency caused by voltage drops in the rectifier circuit. Furthermore, when the secondary battery is charged with an output current of the half-wave rectifier circuit, the secondary battery is charged by pulse charging, which alternates extremely brief charge and self-discharge repeatedly, making it possible to reduce the chance that the secondary battery will be heated or deteriorated by overcharge.

<Thirteenth Aspect of the Present Invention>

According to a thirteenth aspect of the present invention, in the contactless rechargeable secondary battery according to any one of the first to twelfth aspects of the present invention described above, the current limiter circuit includes a constant current circuit.

This feature makes it possible to further reduce the chance that the secondary battery will be charged by overcurrent.

<Fourteenth Aspect of the Present Invention>

According to a fourteenth aspect of the present invention, in the contactless rechargeable secondary battery according to any one of the first to thirteenth aspects of the present invention described above, a quality factor of the resonance of the power receiver circuit is 100 or less.

This feature allows a range of resonance frequency in the power receiver circuit to be expanded, making it possible to mitigate reductions in power transmission efficiency caused by a difference in resonance frequency from a power transmission circuit of the contactless battery charger. This in turn makes it possible to implement a contactless rechargeable secondary battery flexibly compatible with various types of contactless battery chargers which differ in resonance frequency. Furthermore, it is also possible to flexibly accommodate fluctuations of the resonance frequency due to temperature characteristics or aging of circuit elements of the power receiver circuit or power transmission circuit.

<Fifteenth Aspect of the Present Invention>

According to a fifteenth aspect of the present invention, in the contactless rechargeable secondary battery according to any one of the first to fourteenth aspects of the present invention described above, the power receiver circuit has a plurality of the power receiver coils which are installed next to one another in a circumferential direction of the outer casing.

This feature allows electric power to be received by the plurality of power receiver coils, making it possible to improve efficiency of power transmission from the power transmission circuit to the power receiver circuit. Also, since the plurality of power receiver coils are installed next to one another in the circumferential direction of the outer casing, whatever part of the outer surface of the outer casing may face the power transmission coil, any of the plurality of power receiver coils face the power transmission coil. Consequently, regardless of what part of the outer surface of the outer casing faces the power transmission coil, contactless charging can always be done with power transmission efficiency equal to or higher than a predetermined level.

<Sixteenth Aspect of the Present Invention>

According to a sixteenth aspect of the present invention, in the contactless rechargeable secondary battery according to the fifteenth aspect of the present invention described above, the power receiver circuit is configured such that the resonance capacitor is connected in parallel with the plurality of power receiver coils connected in series.

With this feature, the plurality of power receiver coils share the resonance capacitor, making it possible to reduce the number of parts. Consequently, the manufacturing costs can be reduced with maintenance of the operational advantage obtained by installing the plurality of power receiver coils next to one another in the circumferential direction of the outer casing.

<Seventeenth Aspect of the Present Invention>

According to a seventeenth aspect of the present invention, in the contactless rechargeable secondary battery according to the fifteenth aspect of the present invention described above, the power receiver circuit includes a plurality of resonance circuits in which the power receiver coil and the resonance capacitor are connected in parallel; a plurality of the rectifier circuits are installed for the plurality of resonance circuits, respectively; and outputs from the plurality of rectifier circuits are connected in parallel with one another.

With this feature, since a plurality of independent resonance circuits are connected in parallel, making up the power receiver circuit, the secondary battery is charged by the resonance circuit with the highest incoming voltage. Also, since the plurality of power receiver coils are installed next to one another in the circumferential direction of the outer casing, whatever part of the outer surface of the contactless rechargeable secondary battery may face the power transmission coil, any of the plurality of power receiver coils face the power transmission coil. Therefore, regardless of what part of the outer surface of the contactless rechargeable secondary battery faces the power transmission coil, contactless charging can always be done with power transmission efficiency equal to or higher than a predetermined level.

Also, since a plurality of independent resonance circuits are connected in parallel, making up the power receiver circuit, even if the power receiver coil is broken or the like in any of the plurality of resonance circuits, electric power can be received by the other resonance circuits, making it possible to improve durability of the contactless rechargeable secondary battery.

<Eighteenth Aspect of the Present Invention>

According to an eighteenth aspect of the present invention, in the contactless rechargeable secondary battery according to the seventeenth aspect of the present invention described above, the plurality of resonance circuits include a resonance circuit in which the power receiver coil is wound in a normal direction and a resonance circuit in which the power receiver coil is wound in a reverse direction.

With this feature, a positive voltage component of the transmitted AC power can be received by the resonance circuit in which the power receiver coil is wound in the normal direction while a negative voltage component of the transmitted AC power can be received by the resonance circuit in which the power receiver coil is wound in the reverse direction. That is, without the need to install a full-wave rectifier circuit, the negative voltage component of the transmitted AC power can be received as well without being thrown away wastefully. This makes it possible to further improve power transmission efficiency.

<Nineteenth Aspect of the Present Invention>

According to a nineteenth aspect of the present invention, in the contactless rechargeable secondary battery according to the seventeenth or eighteenth aspect of the present invention described above, the plurality of resonance circuits differ in resonance frequency from the resonance circuits adjacent to the power receiver coil.

This feature allows the range of resonance frequency in the power receiver circuit to be expanded, making it possible to mitigate reductions in power transmission efficiency caused by the difference in resonance frequency from a power transmission circuit of the contactless battery charger. This in turn makes it possible to implement a contactless rechargeable secondary battery flexibly compatible with various types of contactless battery chargers which differ in resonance frequency. Furthermore, it is also possible to flexibly accommodate fluctuations of the resonance frequency due to temperature characteristics or aging of circuit elements of the power receiver circuit or power transmission circuit.

<Twentieth Aspect of the Present Invention>

According to a twentieth aspect of the present invention, in the contactless rechargeable secondary battery according to the fifteenth aspect of the present invention described above, the power receiver circuit includes a plurality of resonance circuits in which the power receiver coil and the resonance capacitor are connected in parallel; and the plurality of resonance circuits include a first resonance circuit connected to the rectifier circuit and second resonance circuits connected to the rectifier circuit via other resonance circuits by magnetic coupling between the resonance circuits.

With this feature, since the plurality of independent resonance circuits are magnetically coupled to one another, incoming power of the second resonance circuit with the highest incoming voltage is transmitted to another second resonance circuit by magnetic coupling between the resonance circuits and further to the first resonance circuit, thereby charging the secondary battery through the rectifier circuit. Also, since the plurality of power receiver coils are installed next to one another in the circumferential direction of the outer casing, whatever part of the outer surface of the contactless rechargeable secondary battery may face the power transmission coil, any of the plurality of power receiver coils face the power transmission coil. Therefore, regardless of what part of the outer surface of the contactless rechargeable secondary battery faces the power transmission coil, contactless charging can always be done with power transmission efficiency equal to or higher than a predetermined level.

Also, since a plurality of independent resonance circuits are installed in parallel, making up the power receiver circuit, even if the power receiver coil is broken or the like in any of the plurality of resonance circuits, electric power can be received by the other resonance circuits, making it possible to improve the durability of the contactless rechargeable secondary battery.

Furthermore, since the power receiver circuit is made up of the first resonance circuit connected to the rectifier circuit and the second resonance circuits connected to the rectifier circuit via other resonance circuits by the magnetic coupling between the resonance circuits, the manufacturing costs can be reduced and the durability of the contactless rechargeable secondary battery can be improved by reducing the number of parts of the rectifier circuit.

<Twenty-First Aspect of the Present Invention>

According to a twenty-first aspect of the present invention, in the contactless rechargeable secondary battery according to the twentieth aspect of the present invention described above, the resonance frequency of the second resonance circuits differs from the resonance frequency of the first resonance circuit within a range of a full width at half maximum of the resonance frequency of the first resonance circuit.

This feature allows the range of resonance frequency in the power receiver circuit to be expanded while limiting reductions in power transmission efficiency caused by a difference in resonance frequency from a power transmission circuit of the contactless battery charger to half or less a maximum value. This makes it possible to implement a contactless rechargeable secondary battery flexibly compatible with various types of contactless battery chargers which differ in resonance frequency while maintaining power transmission efficiency equal to or higher than a predetermined level. Furthermore, it is also possible to flexibly accommodate fluctuations of the resonance frequency due to temperature characteristics or aging of circuit elements of the power receiver circuit or power transmission circuit.

<Twenty-Second Aspect of the Present Invention>

A twenty-second aspect of the present invention is a contactless battery charger comprising: a power supply circuit adapted to output AC power of resonance frequency; a power transmission circuit provided with a power transmission coil and a resonance capacitor and adapted to transmit the AC power of the resonance frequency via magnetic field resonance, the resonance capacitor being connected in parallel with the power transmission coil; and a placement surface on which a contactless rechargeable secondary battery is placed in order for the power transmission coil to emit electromagnetic waves, wherein the power transmission coil is installed parallel to the placement surface, being shaped like a sheet by being made up of an electric wire wound along a plane.

The power transmission coil is a so-called flat coil shaped like a sheet by being made up of an electric wire wound along a plane and is installed parallel to the placement surface. Thus, if the power receiver coil of the contactless rechargeable secondary battery is placed facing the placement surface, it is possible to create a condition in which the power receiver coil and power transmission coil face each other, i.e., a condition which enables efficient contactless power transmission. That is, if, for example, contactless rechargeable secondary batteries are left lying down on the placement surface, where each of the contactless rechargeable secondary batteries incorporates the power receiver coil which is shaped like a sheet by being made up of an electric wire wound along a plane and is installed along the inner surface or outer surface of the outer casing, the contactless battery charger according to the twenty-second aspect of the present invention can efficiently perform contactless power transmission. Also, the contactless power transmission by magnetic field resonance method is capable of transmitting electric power over a longer distance than the electromagnetic induction method and is almost free of decrease in power transmission efficiency even if there is some shift in positional relationship between a power transmitter-side coil and power receiver-side coil.

Thus, the contactless battery charger according to the twenty-second aspect of the present invention allows a large number of contactless rechargeable secondary batteries to be charged simultaneously in a contactless manner by simply leaving the contactless rechargeable secondary batteries lying down casually on the placement surface without concern for their orientation and position. That is, the contactless battery charger according to the twenty-second aspect of the present invention makes the contactless rechargeable secondary batteries very easy to handle at the time of charging, thereby making it possible to achieve high convenience by taking full advantage of contactless charging.

Thus, the twenty-second aspect of the present invention provides the operational advantage of being able to implement a more convenient contactless battery charger.

<Twenty-Third Aspect of the Present Invention>

According to a twenty-third aspect of the present invention, the contactless battery charger according to the twenty-second aspect of the present invention described above further comprises a magnetic layer installed between the power transmission coil and the power supply circuit.

This feature can reduce losses caused to the power transmission coil by an eddy current produced in the power supply circuit, making it possible to reduce the chance that the eddy-current losses will decrease power transmission efficiency.

<Twenty-Fourth Aspect of the Present Invention>

According to a twenty-fourth aspect of the present invention, the contactless battery charger according to the twenty-second or twenty-third aspect of the present invention described above, further comprises a control device adapted to control the power supply circuit such that electric power is transmitted intermittently from the power transmission circuit.

When alkaline secondary batteries such as nickel metal hydride secondary batteries or nickel-cadmium secondary batteries are charged with a constant continuous flow of current, there is a tendency that only the most reactive portions located on surfaces of electrodes are charged. Also, an overcharge state continues for a long time after a full charge, and consequently battery reaction is stopped by oxygen gas produced by side reaction, giving rise to the chance of heat generation as well as the chance that deterioration of an electrolyte and electrode plate will progress, resulting in a shortened battery life.

According to the twenty-fourth aspect of the present invention, since the power supply circuit is controlled such that electric power is transmitted intermittently from the power transmission circuit, the contactless rechargeable secondary batteries made up of alkaline secondary batteries can be charged by intermittent charging whereby an idle period and charge period alternate repeatedly. When alkaline secondary batteries are charged by intermittent charging, the condition of electrode surfaces is refreshed during the idle periods, creating a tendency for entire electrode surfaces to react uniformly. Also, self-discharge during the idle period and restoration of a full charge state during the charge period alternate repeatedly, reducing the chance of heat generation and deterioration due to overcharge.

<Twenty-Fifth Aspect of the Present Invention>

According to a twenty-fifth aspect of the present invention, the contactless battery charger according to any one of the twenty-second to twenty-fourth aspects of the present invention described above further comprises a shielding structure adapted to provide a shield to prevent external leakage of electromagnetic waves emitted from the power transmission circuit.

This feature prevents electromagnetic waves from leaking outside from the contactless battery charger and thereby proactively prevents neighboring electronic devices and human bodes from being affected by electromagnetic leakage from the contactless battery charger.

<Twenty-Sixth Aspect of the Present Invention>

According to a twenty-sixth aspect of the present invention, the contactless battery charger according to the twenty-fifth aspect of the present invention described above further comprises a switch adapted to open and close a route of AC power supply from the power supply circuit to the power transmission circuit by engaging with the shielding structure such that the AC power is supplied from the power supply circuit to the power transmission circuit with a shield against the electromagnetic waves from the power transmission circuit being provided by the shielding structure.

With this feature, since electromagnetic waves are transmitted from the power transmission circuit only when a shield against the electromagnetic waves from the power transmission circuit is provided by the shielding structure, external leakage of the electromagnetic waves from the contactless battery charger can be prevented reliably.

<Twenty-Seventh Aspect of the Present Invention>

According to a twenty-seventh aspect of the present invention, in the contactless battery charger according to the twenty-sixth aspect of the present invention, the shielding structure includes a shielding cover openably and closably supported and adapted to cover the placement surface when closed; and the switch opens with the shielding cover closed and with the surroundings of the placement surface being shielded.

With this feature, electromagnetic waves are emitted from the power transmission circuit only when a shield against the electromagnetic waves from the power transmission circuit is provided by the shielding structure, i.e., when the shielding cover is closed, but are not emitted from the power transmission circuit under other conditions. This reliably prevents external leakage of the electromagnetic waves from the contactless battery charger.

<Twenty-Eighth Aspect of the Present Invention>

According to a twenty-eighth aspect of the present invention, in the contactless battery charger according to the twenty-sixth aspect of the present invention, the shielding structure includes an insertable/withdrawable tray whose inside bottom surface serves as the placement surface; and the switch opens with the tray being inserted into a predetermined position, shielding surroundings of the inside bottom surface of the tray.

With this feature, electromagnetic waves are emitted from the power transmission circuit only when a shield against the electromagnetic waves from the power transmission circuit is provided by the shielding structure, i.e., when the tray is inserted into the predetermined position, but are not emitted from the power transmission circuit under other conditions. This reliably prevents external leakage of the electromagnetic waves from the contactless battery charger.

Advantageous Effects of Invention

The present invention makes it possible to implement a more convenient contactless rechargeable secondary battery and contactless battery charger.

BRIEF DESCRIPTION OF DRAWINGS

FIG. 1A is a front view of a contactless rechargeable alkaline secondary battery according to a first embodiment.

FIG. 6 is a circuit diagram of the contactless battery charger according to the first embodiment.

FIG. 14 is a sectional view of a contactless rechargeable alkaline secondary battery according to a seventh embodiment taken along line III-III.

DESCRIPTION OF EMBODIMENTS

Embodiments of the present invention will be described below with reference to the drawings.

It should be noted that the present invention is not particularly limited to the embodiments described below and it goes without saying that various modifications are possible within the scope of the invention described in the claims.

First Embodiment

1. Configuration of Contactless Rechargeable Secondary Battery

A contactless rechargeable alkaline secondary battery 1 according to a first embodiment of the present invention will be described with reference to FIGS. 1 to 4.

Figure 1B:
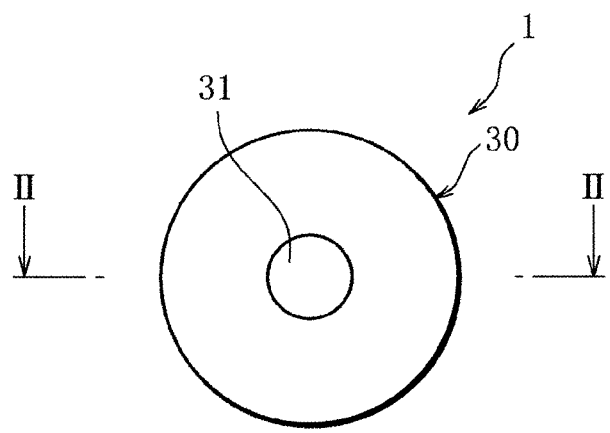
FIG. 1B is a plan view of the contactless rechargeable alkaline secondary battery according to the first embodiment.
Figure 2:
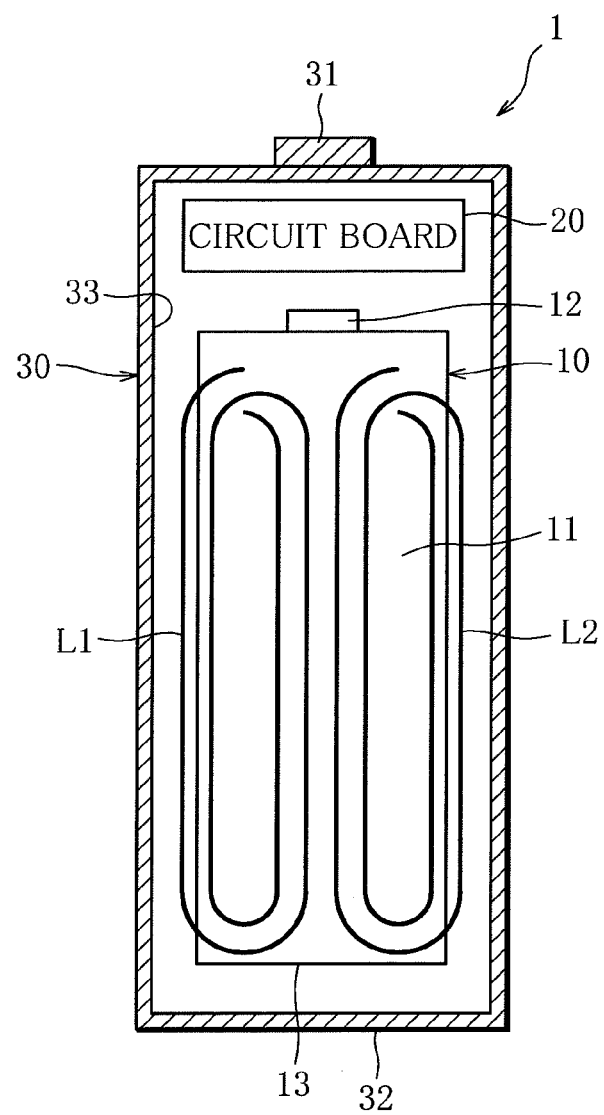
FIG. 2 is a sectional view of the contactless rechargeable alkaline secondary battery according to the first embodiment taken along line II-II.
Figure 3:
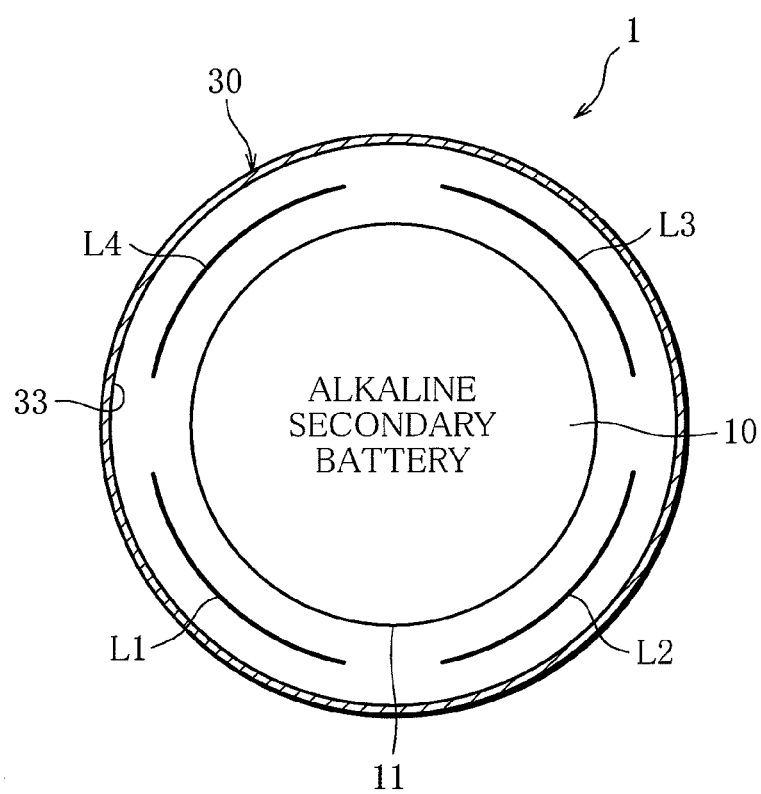
FIG. 3 is a sectional view of the contactless rechargeable alkaline secondary battery according to the first embodiment taken along line I-I.
Figure 4:
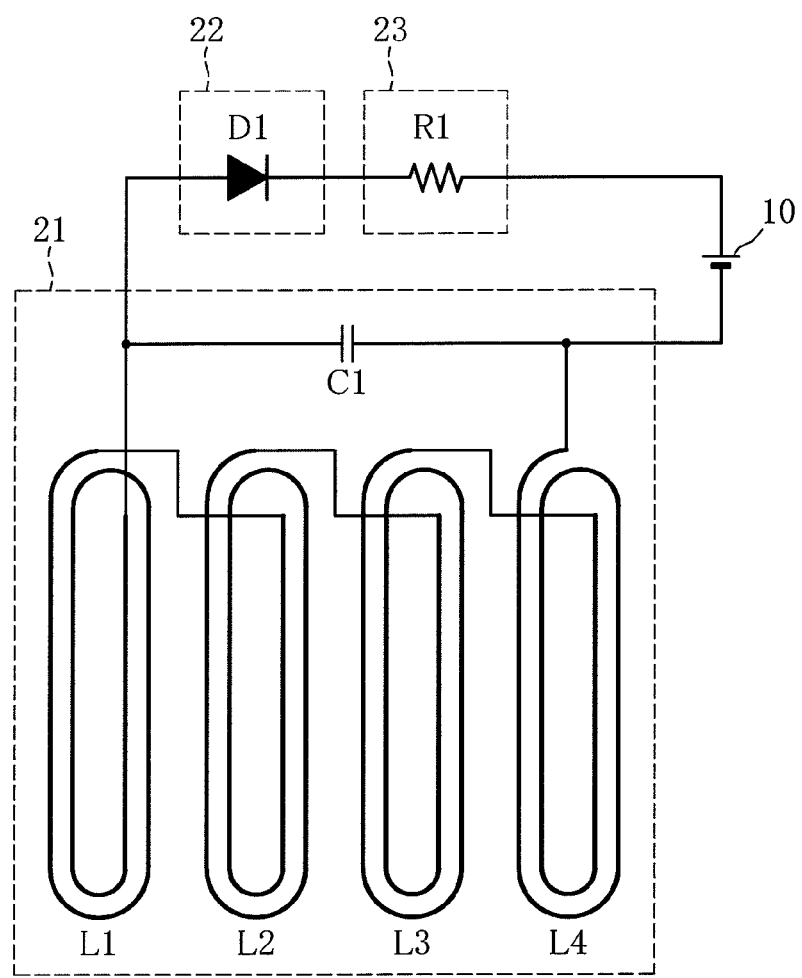
FIG. 4 is a circuit diagram of the contactless rechargeable alkaline secondary battery according to the first embodiment.

FIG. 1A is a front view illustrating an appearance of the contactless rechargeable alkaline secondary battery 1 according to the first embodiment and FIG. 1B is a plan view illustrating the appearance of the contactless rechargeable alkaline secondary battery 1 according to the first embodiment. FIG. 2 is a sectional view of the contactless rechargeable alkaline secondary battery 1 according to the first embodiment, illustrating a state in which only an outer casing 30 is cut along line II-II in FIG. 1B. FIG. 3 is a sectional view of the contactless rechargeable alkaline secondary battery 1 according to the first embodiment, illustrating a I-I section of FIG. 1A. FIG. 4 is a circuit diagram of the contactless rechargeable alkaline secondary battery 1 according to the first embodiment.

The contactless rechargeable alkaline secondary battery 1, which is a "contactless rechargeable secondary battery", includes an alkaline secondary battery 10, a power receiver circuit 21, a rectifier circuit 22, a current limiter circuit 23, and an outer casing 30.

The alkaline secondary battery 10 as a "secondary battery" is a known nickel metal hydride secondary battery or nickel-cadmium secondary battery. The alkaline secondary battery 10 is not particularly limited in terms of shape, structure, and the like, but according to the present embodiment, the alkaline secondary battery 10 is identical in size and shape with a so-called AAA dry battery (code R03 of IEC60086). More specifically, the alkaline secondary battery 10 includes a positive plate adapted to hold a positive active material, a negative plate adapted to hold a negative active material, a separator adapted to separate the positive plate and negative plate from each other, in which an electrode body wound into a spiral is housed in a package can which is a closed-end metal cylinder, the electrode body being formed by laying the positive plate and negative plate one on top of the other via the separator with the negative plate placed outside, and the package can is filled with an electrolyte (not shown). The positive plate in the alkaline secondary battery 10 is connected to a positive pole 12 installed on top of the alkaline secondary battery 10 while the negative plate in the alkaline secondary battery 10 is connected to a negative pole 13 installed at a bottom of the alkaline secondary battery 10 (not shown).

The power receiver circuit 21 receives AC power of resonance frequency via magnetic field resonance and includes four power receiver coils L1 to L4 and a resonance capacitor C1. The power receiver coils L1 to L4 are so-called flat coils each shaped like a sheet by being made up of an electric wire wound along a plane and are installed between the outer surface 11 of the alkaline secondary battery 10 and an inner surface 33 of the outer casing 30. More specifically, the power receiver coils L1 to L4 are installed next to one another in the circumferential direction along the inner surface 33 of the outer casing 30. The resonance capacitor C1 is mounted on a circuit board 20. The resonance frequency of the power receiver circuit 21 depends on inductance of the power receiver coils L1 to L4 and capacitance of the resonance capacitor C1, and is set, for example, to any frequency in the range of a few MHz to tens of MHz.

The four power receiver coils L1 to L4 are connected in series and the resonance capacitor C1 is connected in parallel with the four power receiver coils L1 to L4 connected in series. A connection point between one end of the resonance capacitor C1 and the power receiver coil L1 is connected to the positive pole 12 of the alkaline secondary battery 10 through a rectifier diode D1 and current limiting resistor R1 described later. A connection point between another end of the resonance capacitor C1 and the power receiver coil L4 is connected to the negative pole 13 of the alkaline secondary battery 10. That is, the power receiver circuit 21 according to the first embodiment is configured such that the plural power receiver coils L1 to L4 share the resonance capacitor C1. Although the power receiver circuit 21 is not particularly limited to such a configuration, the configuration in which the plural power receiver coils L1 to L4 share the resonance capacitor C1 can reduce the number of parts, thereby making it possible to reduce manufacturing costs of the contactless rechargeable alkaline secondary battery 1.

The rectifier circuit 22 includes the rectifier diode D1 mounted on a circuit board 20 and rectifies the AC power received by the power receiver circuit 21. The rectifier diode D1 has its anode connected to a connection point between the power receiver coil L1 and resonance capacitor C1, and its cathode connected to one end of the current limiting resistor R1 described later.

The rectifier circuit 22 may have any circuit configuration as long as the circuit is designed to rectify AC power. For example, the rectifier circuit 22 may be a full-wave rectifier circuit made up of a bridge circuit or the like, but a half-wave rectifier circuit is preferable. The adoption of a half-wave rectifier circuit smaller in the number of circuit elements than a full-wave rectifier circuit allows manufacturing costs to be reduced greatly. In particular, a half-wave rectifier circuit made up of a single rectifier diode D1 as with the present embodiment has a marked effect of reducing the manufacturing costs of the rectifier circuit. Also, the adoption of a half-wave rectifier circuit smaller in the number of circuit elements than a full-wave rectifier circuit allows voltage drops in the rectifier circuit 22 to be reduced. This makes it possible to mitigate reductions in charge efficiency caused by voltage drops in the rectifier circuit 22. Furthermore, when the alkaline secondary battery 10 is charged with an output current of the half-wave rectifier circuit, the alkaline secondary battery 10 is charged by pulse charging, which alternates extremely brief charge and self-discharge repeatedly. The pulse charging makes it possible to reduce the chance that the alkaline secondary battery 10 will be heated or deteriorated by overcharge.

The current limiter circuit 23 includes the current limiting resistor R1 mounted on the circuit board 20 and limits a charging current flowing from the rectifier circuit 22 to the alkaline secondary battery 10. The current limiting resistor R1 is connected at one end to the cathode of the rectifier diode D1, and at another end to the positive pole 12 of the alkaline secondary battery 10. The current limiter circuit 23 can reduce the chance that a charging current flowing from the power receiver circuit 21 to the alkaline secondary battery 10 will become overcurrent. By taking into consideration the fact that the alkaline secondary battery 10 does not require close charge control, preferably the current limiter circuit 23 has a simple circuit configuration with a reduced number of parts from the standpoint of reducing the manufacturing costs and easing the manufacture of the contactless rechargeable alkaline secondary battery 1.

The outer casing 30 is a structure configured to be cylindrical in shape, provided with an internal space for housing the alkaline secondary battery 10, circuit board 20, and power receiver coils L1 to L4, and made of a material transparent to at least electromagnetic waves of the same resonance frequency as the power receiver circuit 21. The outer casing 30 includes a positive terminal 31 connected with the positive pole 12 of the alkaline secondary battery 10 and a negative terminal 32 connected with the negative pole 13 of the alkaline secondary battery 10. More specifically, the outer casing 30 is identical in size and shape with a so-called AA dry battery (code R6 of IEC60086).

2. Configuration of Contactless Battery Charger

A contactless battery charger according to the first embodiment of the present invention will be described with reference to FIGS. 5 and 6.

Figure 5A:
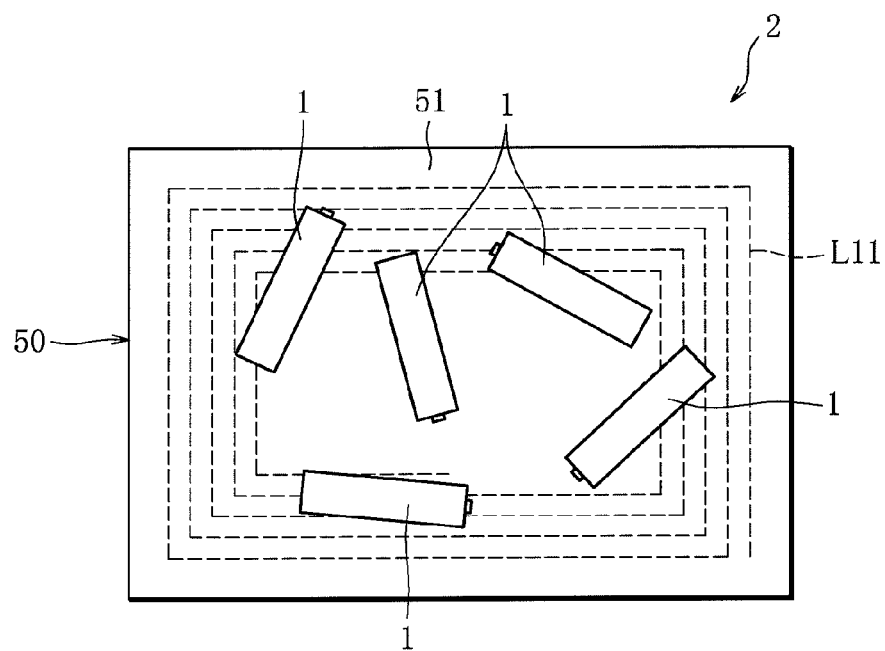
FIG. 5A is a plan view illustrating an appearance of a contactless battery charger according to the first embodiment.
Figure 5B:
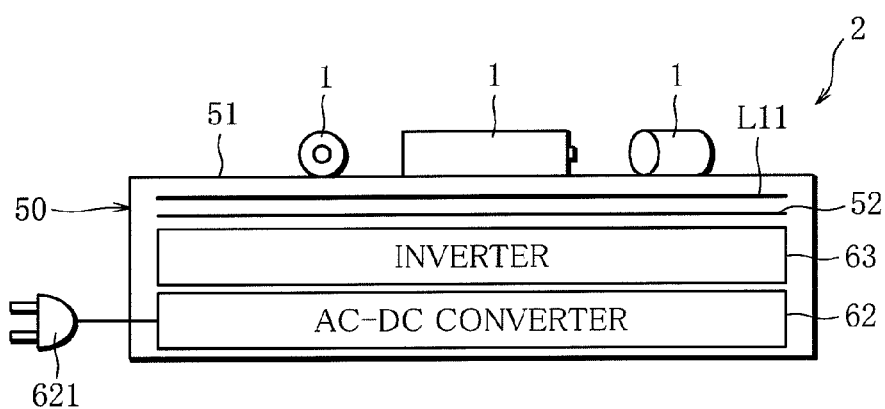
FIG. 5B is a sectional view of the contactless battery charger according to the first embodiment when viewed from the front.

FIG. 5A is a plan view illustrating an appearance of the contactless battery charger 2 according to the first embodiment. FIG. 5B is a sectional view of the contactless battery charger 2 according to the first embodiment when viewed from the front. FIG. 6 is a circuit diagram of the contactless battery charger 2 according to the first embodiment.

The contactless battery charger 2 includes a charger body 50, a power transmission circuit 61, an AC-DC converter 62, an inverter 63, and a control device 64.

The charger body 50 incorporates the power transmission circuit 61, AC-DC converter 62, inverter 63, and control device 64, and a placement surface 51 is provided on a top face of the charger body 50. The placement surface 51, on which the contactless rechargeable alkaline secondary battery 1 is placed, is made of a material transparent to at least electromagnetic waves of the same resonance frequency as the power transmission circuit 61.

The power transmission circuit 61 transmits AC power of resonance frequency via magnetic field resonance, and includes a power transmission coil L11 and a resonance capacitor C11. The power transmission coil L11 is a so-called flat coil shaped like a sheet by being made up of an electric wire wound along a plane and is installed parallel to the placement surface 51. The resonance capacitor C11 is connected in series with the power transmission coil L11. The resonance frequency of the power transmission circuit 61 depends on inductance of the power transmission coil L11 and capacitance of the resonance capacitor C11.

A known AC-DC converter 62 of a "power supply circuit" is a device adapted to convert commercial AC power received via a plug 621 into DC power. A known inverter 63 of the "power supply circuit" is a device adapted to convert the DC power supplied from the AC-DC converter 62 into AC power of the resonance frequency and output the AC power. A switch SW opens and closes a route of power supply from the AC-DC converter 62 to the inverter 63. The control device 64 controls the inverter 63.

A magnetic sheet 52 serving as a "magnetic layer" is installed between the placement surface 51 and inverter 63 although the magnetic sheet 52 is not an indispensable element of the present invention. The magnetic sheet 52 is produced, for example, by forming a resin with powder of ferrite, an amorphous or other metallic magnetic substance, sintered ferrite, or the like scattered thereon into a sheet. By installing the magnetic sheet 52 between the placement surface 51 and inverter 63 in this way, it is possible to reduce losses caused to the power transmission coil L11 by an eddy current produced in the inverter 63, and thereby reduce the chance that the eddy-current losses will decrease power transmission efficiency.

3. Power Transmission by Magnetic Field Resonance

Charging of the contactless rechargeable alkaline secondary battery 1 by the contactless battery charger 2 will be described with reference to FIGS. 1 to 6.

The contactless rechargeable alkaline secondary battery 1 includes the power receiver coils L1 to L4 each of which is shaped like a sheet by being made up of an electric wire wound along a plane and is installed along the inner surface 33 of the outer casing 30 (FIGS. 2 and 3). On the other hand, the contactless battery charger 2 includes the power transmission coil L11 which is shaped like a sheet by being made up of an electric wire wound along a plane and is installed parallel to the placement surface 51 (FIGS. 5 and 6). Thus, as illustrated in FIG. 5, if the contactless rechargeable alkaline secondary battery 1 is simply left lying down on the placement surface 51 of the contactless battery charger 2, any of the power receiver coils L1 to L4 is placed facing the power transmission coil L11 of the contactless battery charger 2. That is, if simply left lying down on the placement surface 51 of the contactless battery charger 2, the contactless rechargeable alkaline secondary battery 1 can create a condition in which contactless power transmission can be performed efficiently by magnetic field resonance.

When the switch SW of the contactless battery charger 2 is operated in this state and electromagnetic waves of the resonance frequency are emitted from the power transmission coil L11, contactless power transmission from the contactless battery charger 2 to the contactless rechargeable alkaline secondary battery 1 is performed by magnetic field resonance method. The contactless power transmission by magnetic field resonance method is capable of transmitting electric power over a longer distance than the electromagnetic induction method and is almost free of decrease in power transmission efficiency even if there is some shift in positional relationship between the power transmission coil L11 and the power receiver coils L1 to L4.

That is, as illustrated in FIG. 5, a large number of the contactless rechargeable alkaline secondary batteries 1 according to the present invention can be charged simultaneously in a contactless manner by simply being left lying down casually on the placement surface 51 of the contactless battery charger 2 without concern for their orientation and position. That is, the contactless rechargeable alkaline secondary battery 1 according to the present invention is very easy to handle at the time of charging, thereby making it possible to achieve high convenience by taking full advantage of contactless charging. Similarly, the contactless battery charger 2 according to the present invention makes the contactless rechargeable alkaline secondary battery 1 very easy to handle at the time of charging, thereby making it possible to achieve very high convenience by taking full advantage of contactless charging.

The contactless power transmission by magnetic field resonance method generally uses electromagnetic waves of a higher frequency than the electromagnetic induction method, making it possible to implement practical power transmission using a smaller number of coil turns than the electromagnetic induction method. Therefore, even when the above-described configuration is adopted in which each of the power receiver coils L1 to L4 is shaped like a sheet by being made up of an electric wire wound along a plane and is installed along the inner surface 33 of the outer casing 30, there is almost no chance that battery capacity of the alkaline secondary battery 10 will be limited by the power receiver coils L1 to L4 and sufficient battery capacity can be secured within a range of sizes interchangeable with a dry battery.

Thus, the present invention makes it possible to implement a more convenient contactless rechargeable alkaline secondary battery 1 and contactless battery charger 2.

Also, in the present invention, the power receiver circuit 21 may be made up of a single power receiver coil and single resonance capacitor, but preferably the plural power receiver coils L1 to L4 are installed next to one another in the circumferential direction of the outer casing 30 as with the present embodiment. Although this is not an indispensable element of the present invention, this allows electric to be received by the plural power receiver coils L1 to L4, making it possible to improve efficiency of power transmission from the power transmission circuit 61 to the power receiver circuit 21. Also, with the contactless rechargeable alkaline secondary battery 1, whatever part of the outer surface may face the power transmission coil L11, any of the plural power receiver coils L1 to L4 will face the power transmission coil L11. Therefore, regardless of what part of the outer surface faces the power transmission coil L11, the contactless rechargeable alkaline secondary battery 1 can always undergo contactless charging with power transmission efficiency equal to or higher than a predetermined level.

Also, in the present invention, preferably a quality factor of the resonance of the power receiver circuit is 100 or less. Although this is not an indispensable element of the present invention, this allows the range of resonance frequency in the power receiver circuit 21 to be expanded, making it possible to mitigate reductions in power transmission efficiency caused by a difference in resonance frequency from a power transmission circuit 61 of the contactless battery charger 2. This in turn makes it possible to implement a contactless rechargeable alkaline secondary battery 1 flexibly compatible with various types of contactless battery chargers 2 which differ in resonance frequency. Furthermore, it is also possible to flexibly accommodate fluctuations of the resonance frequency due to temperature characteristics or aging of circuit elements of the power receiver circuit 21 or power transmission circuit 61.

Also, in the present invention, preferably a center of gravity of the contactless rechargeable alkaline secondary battery 1 is configured to be eccentric to an axis of the outer casing 30, for example, by displacing an axis of the alkaline secondary battery 10 with respect to the axis of the outer casing 30 or by installing a balance weight or the like at a location displaced from the axis of the outer casing 30. Although this is not an indispensable element of the present invention, if this is implemented, when the contactless rechargeable alkaline secondary battery 1 is laid down on the placement surface 51 of the contactless battery charger 2, the positional relationship between the power transmission coil L11 and the power receiver coils L1 to L4 always remains constant according to an eccentricity direction of the center of gravity. Thus, in this state, if the power receiver coils L1 to L4 are placed relative to the eccentricity direction of the center of gravity such that the positional relationship between the power transmission coil L11 and the power receiver coils L1 to L4 will maximize power transmission efficiency, contactless charging can always be done with the highest power transmission efficiency.

Generally, when the alkaline secondary battery 10 is charged with a constant continuous flow of current, there is a tendency that only the most reactive portions located on surfaces of electrodes are charged. Also, after a full charge, the alkaline secondary battery 10 remains overcharged for a long time and consequently battery reaction is stopped by oxygen gas produced by side reaction, giving rise to the chance of heat generation as well as the chance that deterioration of an electrolyte and electrode plate will progress, resulting in a shortened battery life. Thus, in the present invention, preferably the contactless battery charger 2 controls the inverter 63 such that electric power is transmitted intermittently from the power transmission circuit 61. Although this is not an indispensable element of the present invention, this allows the alkaline secondary battery 10 to be charged by intermittent charging whereby an idle period and charge period alternate repeatedly. When the alkaline secondary battery 10 is charged by intermittent charging, the condition of electrode surfaces is refreshed during idle periods, creating a tendency for entire electrode surfaces to react uniformly. Also, self-discharge during the idle period and restoration of a full charge state during the charge period alternate repeatedly, reducing the chance of the alkaline secondary battery 10 being heated and deteriorated due to overcharge.

Second Embodiment

A second embodiment of the present invention differs from the first embodiment in configuration of the contactless rechargeable alkaline secondary battery 1. The contactless rechargeable alkaline secondary battery 1 according to the second embodiment of the present invention will be described below with reference to FIGS. 7 and 8.

Components in common with the first embodiment are denoted by the same reference numerals as the corresponding components of the first embodiment, and detailed description thereof will be omitted.

Figure 7:
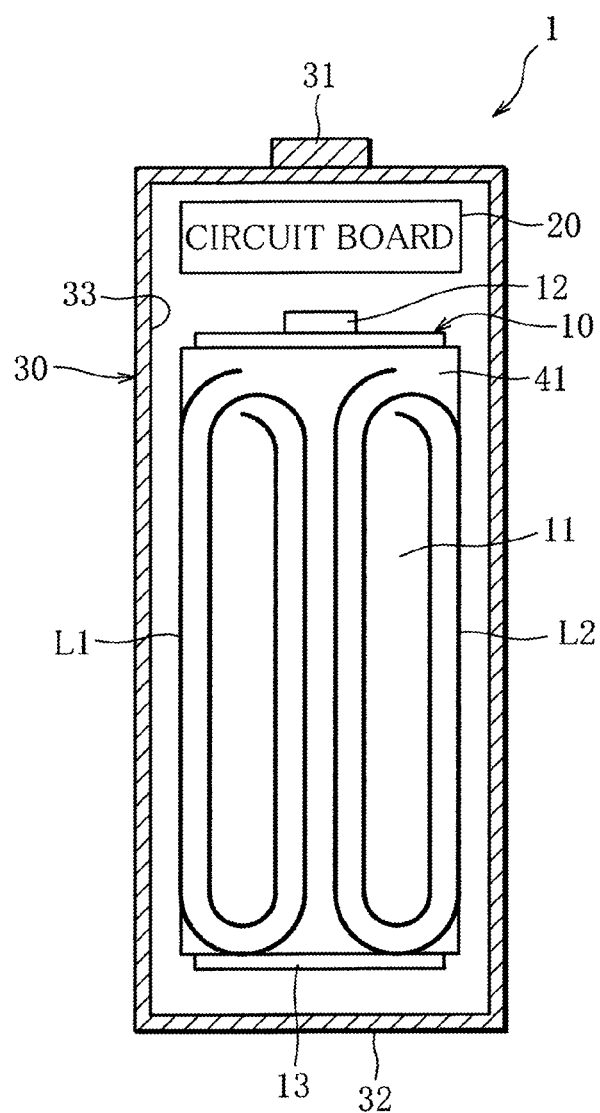
FIG. 7 is a sectional view of a contactless rechargeable alkaline secondary battery according to a second embodiment taken along line II-II.
Figure 8:
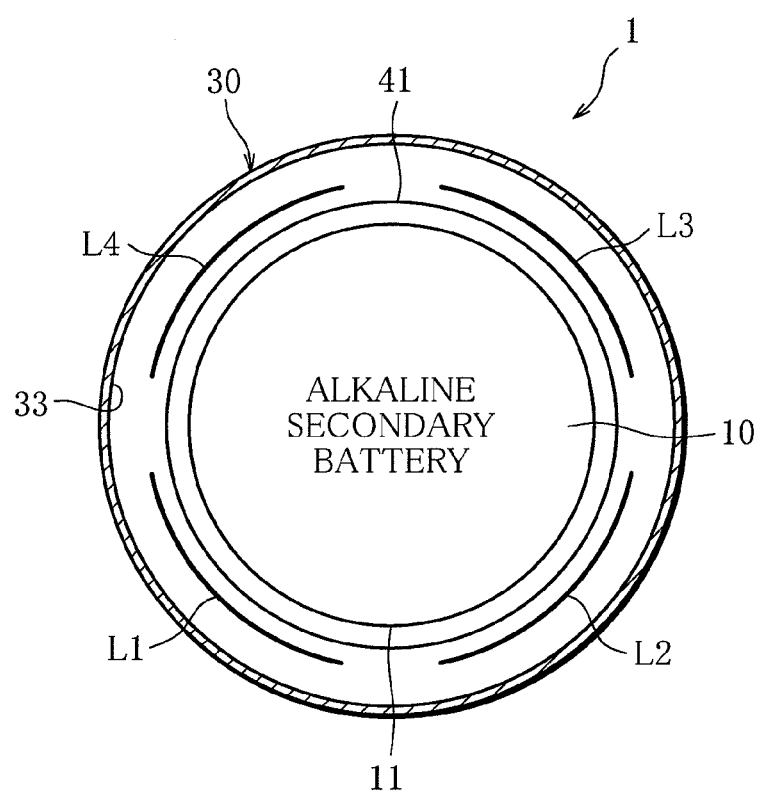
FIG. 8 is a sectional view of the contactless rechargeable alkaline secondary battery according to the second embodiment taken along line I-I.

FIG. 7 is a sectional view of the contactless rechargeable alkaline secondary battery 1 according to the second embodiment, illustrating a state in which only the outer casing 30 is cut along line II-II in FIG. 1B. FIG. 8 is a sectional view of the contactless rechargeable alkaline secondary battery 1 according to the second embodiment, illustrating the I-I section of FIG. 1A.

Except for being equipped with a magnetic sheet 41 as a "magnetic layer", the contactless rechargeable alkaline secondary battery 1 according to the second embodiment has the same configuration as the first embodiment. The magnetic sheet 41 is installed between the alkaline secondary battery 10 and the power receiver coils L1 to L4 and is produced, for example, by forming a resin with powder of ferrite, an amorphous or other metallic magnetic substance, sintered ferrite, or the like scattered thereon into a sheet.

In this way, by installing the magnetic sheet 41 between the alkaline secondary battery 10 and the power receiver coils L1 to L4, it is possible to reduce losses caused to the power receiver coils L1 to L4 by an eddy current produced on the outer surface 11 of the alkaline secondary battery 10. This in turn makes it possible to reduce the chance that the eddy-current losses will decrease power reception efficiency of the power receiver coils L1 to L4.

Third Embodiment

A third embodiment of the present invention differs from the second embodiment in configuration of the contactless rechargeable alkaline secondary battery 1. The contactless rechargeable alkaline secondary battery 1 according to the third embodiment of the present invention will be described below with reference to FIG. 9.

Components in common with the second embodiment are denoted by the same reference numerals as the corresponding components of the second embodiment, and detailed description thereof will be omitted.

Figure 9:
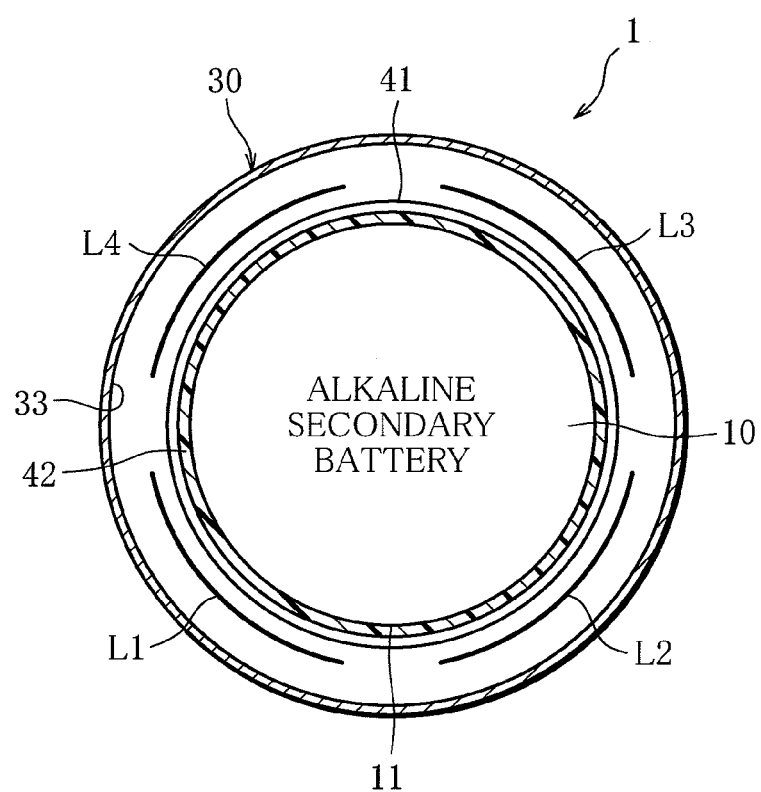
FIG. 9 is a sectional view of a contactless rechargeable alkaline secondary battery according to a third embodiment taken along line I-I.

FIG. 9 is a sectional view of the contactless rechargeable alkaline secondary battery 1 according to the third embodiment, illustrating the I-I section of FIG. 1A.

Except for being equipped with an insulating resin layer 42 as an "insulating layer", the contactless rechargeable alkaline secondary battery 1 according to the third embodiment has the same configuration as the second embodiment. The insulating resin layer 42 is made of an insulating resin and installed between the alkaline secondary battery 10 and the power receiver coils L1 to L4. More specifically, the insulating resin layer 42 is installed between the alkaline secondary battery 10 and the magnetic sheet 41. In this way, by installing the insulating resin layer 42 between the alkaline secondary battery 10 and the power receiver coils L1 to L4, it is possible to reduce the chance that the power receiver coils L1 to L4 will touch the outer surface 11 of the alkaline secondary battery 10, causing a short-circuit or the like of the power receiver coils L1 to L4.

Fourth Embodiment

A fourth embodiment of the present invention differs from the third embodiment in configuration of the contactless rechargeable alkaline secondary battery 1. The contactless rechargeable alkaline secondary battery 1 according to the fourth embodiment of the present invention will be described below with reference to FIG. 10.

Components in common with the third embodiment are denoted by the same reference numerals as the corresponding components of the third embodiment, and detailed description thereof will be omitted.

Figure 10:
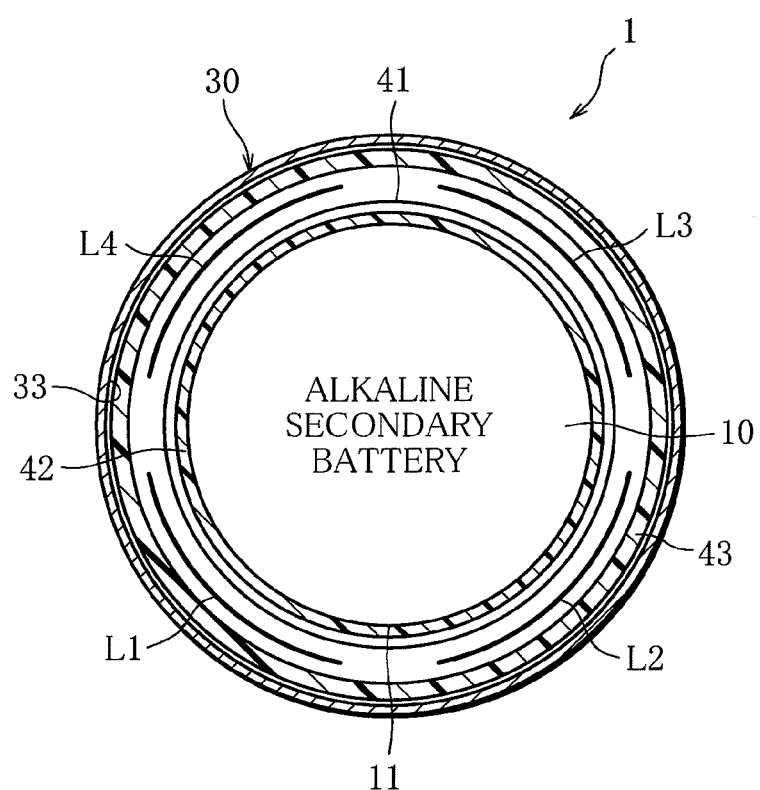
FIG. 10 is a sectional view of a contactless rechargeable alkaline secondary battery according to a fourth embodiment taken along line I-I.

FIG. 10 is a sectional view of the contactless rechargeable alkaline secondary battery 1 according to the fourth embodiment, illustrating the I-I section of FIG. 1A.

Except for being equipped with an insulating resin layer 43 as an "insulating layer", the contactless rechargeable alkaline secondary battery 1 according to the fourth embodiment has the same configuration as the third embodiment. The insulating resin layer 43 is made of an insulating resin and installed between the power receiver coils L1 to L4 and the inner surface 33 of the outer casing 30. In this way, by installing the insulating resin layer 43 between the power receiver coils L1 to L4 and the inner surface 33 of the outer casing 30, it is possible to reduce the chance that the power receiver coils L1 to L4 will touch the inner surface 33 of the outer casing 30, causing a short-circuit or the like of the power receiver coils L1 to L4.

Fifth Embodiment

A fifth embodiment of the present invention differs from the first embodiment in configuration of the contactless rechargeable alkaline secondary battery 1. The configuration of the contactless rechargeable alkaline secondary battery 1 according to the fifth embodiment will be described below with reference to FIGS. 11 and 12.

Components in common with the first embodiment are denoted by the same reference numerals as the corresponding components of the first embodiment, and detailed description thereof will be omitted.

Figure 11:
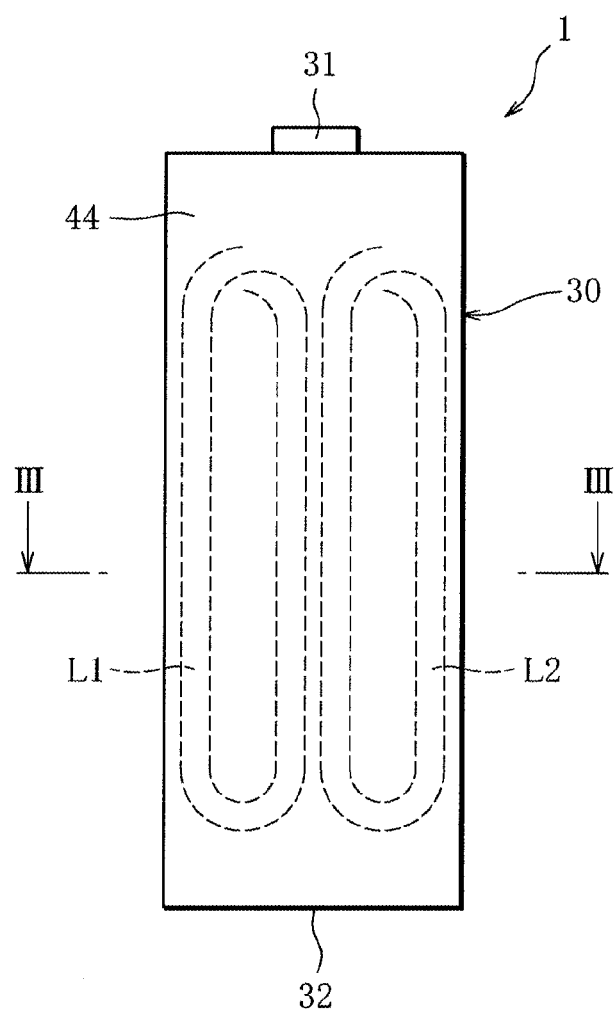
FIG. 11 is a front view illustrating an appearance of a contactless rechargeable alkaline secondary battery according to a fifth embodiment.
Figure 12:
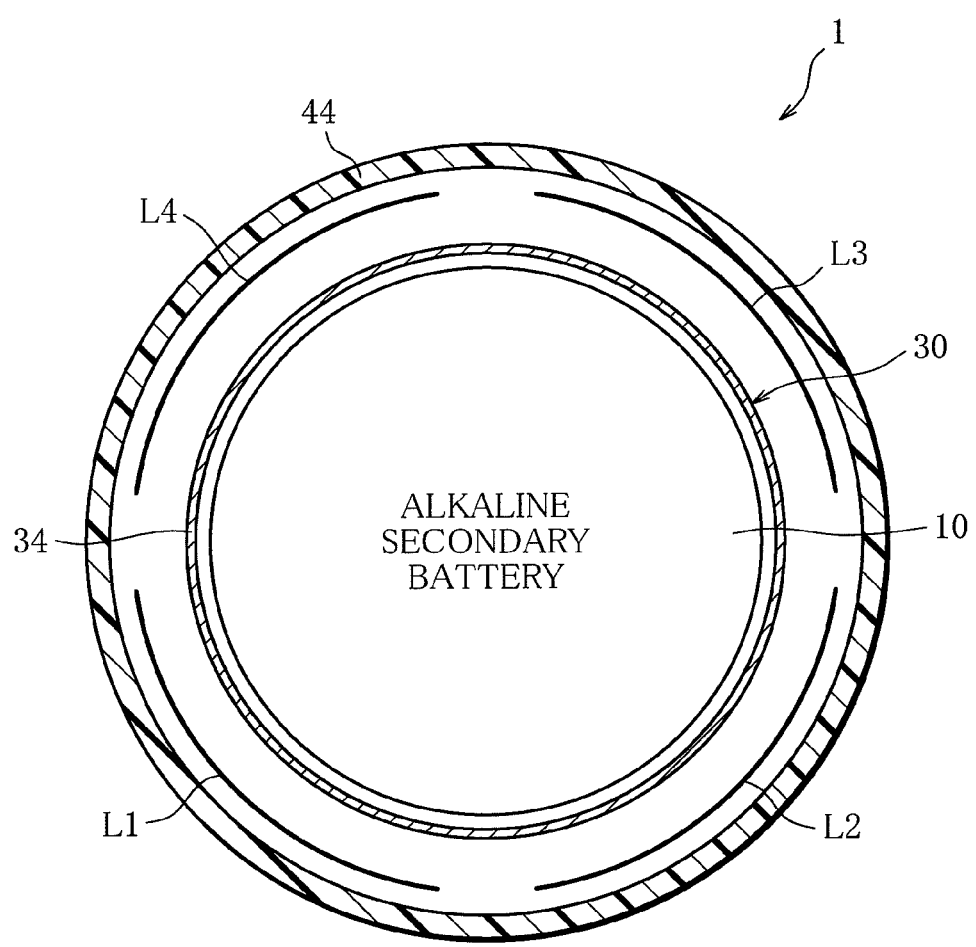
FIG. 12 is a sectional view of a contactless rechargeable alkaline secondary battery according to the fifth embodiment taken along line III-III.

FIG. 11 is a front view illustrating an appearance of the contactless rechargeable alkaline secondary battery 1 according to the fifth embodiment. FIG. 12 is a sectional view of the contactless rechargeable alkaline secondary battery 1 according to the fifth embodiment, illustrating a III-III section of FIG. 11.

The contactless rechargeable alkaline secondary battery 1 according to the fifth embodiment includes the alkaline secondary battery 10, the power receiver circuit 21, the rectifier circuit 22, the current limiter circuit 23, the outer casing 30, and an insulating resin film 44. The alkaline secondary battery 10, power receiver circuit 21, rectifier circuit 22, current limiter circuit 23, and outer casing 30 have the same configurations as in the first embodiment.

Note that the outer casing 30 according to the fifth embodiment does not need to be made of a material transparent to electromagnetic waves of the same resonance frequency as the power receiver circuit 21.

The contactless rechargeable alkaline secondary battery 1 according to the fifth embodiment has the power receiver coils L1 to L4 installed along an outer surface 34 of the outer casing 30 and structurally differs from the first embodiment in that the insulating resin film 44 is installed to cover outer sides of the power receiver coils L1 to L4. More specifically, the power receiver coils L1 to L4 are installed next to one another in the circumferential direction along the outer surface 34 of the outer casing 30. The insulating resin film 44 serving as an "insulating layer" is a coating made of an insulating resin. Although the insulating resin film 44 is not an indispensable element of the present invention, preferably the insulating resin film 44 is installed in order to reduce the chance that damage, a short-circuit, or the like will be caused to the power receiver coils L1 to L4 by some kind of external factor.

As with the first embodiment, a large number of the contactless rechargeable alkaline secondary batteries 1 configured as described above can be charged simultaneously in a contactless manner by simply being left lying down casually on the placement surface 51 of the contactless battery charger 2 without concern for their orientation and position (FIG. 5). That is, as with the first embodiment, the present embodiment enables easy handling at the time of charging, thereby making it possible to achieve high convenience by taking full advantage of contactless charging. Thus, as with the first embodiment, the present embodiment makes it possible to implement a more convenient contactless rechargeable alkaline secondary battery 1 and contactless battery charger 2.

Sixth Embodiment

A sixth embodiment of the present invention differs from the fifth embodiment in configuration of the contactless rechargeable alkaline secondary battery 1. The contactless rechargeable alkaline secondary battery 1 according to the sixth embodiment of the present invention will be described below with reference to FIG. 13.

Components in common with the fifth embodiment are denoted by the same reference numerals as the corresponding components of the fifth embodiment, and detailed description thereof will be omitted.

Figure 13:
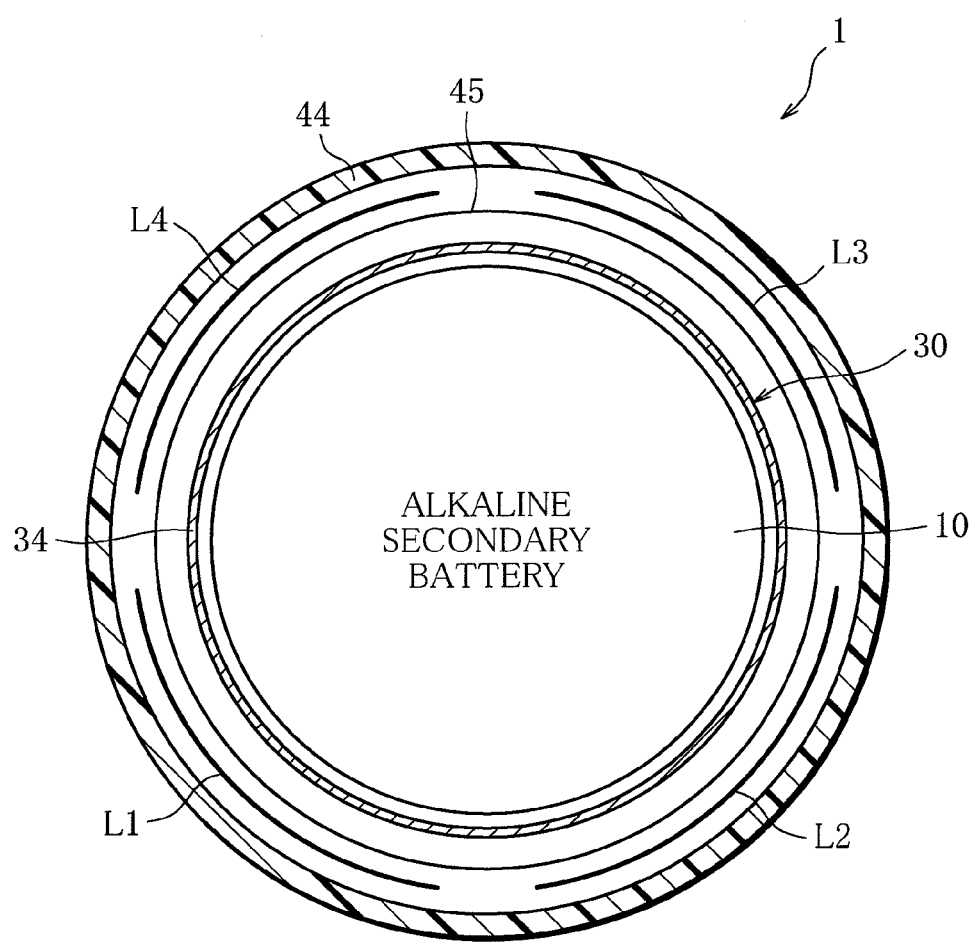
FIG. 13 is a sectional view of a contactless rechargeable alkaline secondary battery according to a sixth embodiment taken along line III-III.

FIG. 13 is a sectional view of the contactless rechargeable alkaline secondary battery 1 according to the sixth embodiment, illustrating the III-III section of FIG. 11.

Except for being equipped with a magnetic sheet 45 as a "magnetic layer", the contactless rechargeable alkaline secondary battery 1 according to the sixth embodiment has the same configuration as the fifth embodiment. The magnetic sheet 45 is installed between the outer surface 34 of the outer casing 30 and the power receiver coils L1 to L4 and is produced, for example, by forming a resin with powder of ferrite, an amorphous or other metallic magnetic substance, sintered ferrite, or the like scattered thereon into a sheet.

In this way, by installing the magnetic sheet 45 between the outer surface 34 of the outer casing 30 and the power receiver coils L1 to L4, it is possible to reduce losses caused to the power receiver coils L1 to L4 by an eddy current produced on the outer surface 34 of the outer casing 30. This in turn makes it possible to reduce the chance that the eddy-current losses will decrease power reception efficiency of the power receiver coils L1 to L4.

Seventh Embodiment

A seventh embodiment of the present invention differs from the sixth embodiment in configuration of the contactless rechargeable alkaline secondary battery 1. The contactless rechargeable alkaline secondary battery 1 according to the seventh embodiment of the present invention will be described below with reference to FIG. 14.

Components in common with the sixth embodiment are denoted by the same reference numerals as the corresponding components of the sixth embodiment, and detailed description thereof will be omitted.

FIG. 14 is a sectional view of the contactless rechargeable alkaline secondary battery 1 according to the seventh embodiment, illustrating the III-III section of FIG. 11.

Except for being equipped with an insulating resin layer 46 as an "insulating layer", the contactless rechargeable alkaline secondary battery 1 according to the seventh embodiment has the same configuration as the sixth embodiment. The insulating resin layer 46 is made of an insulating resin and is installed between the outer surface 34 of the outer casing 30 and the power receiver coils L1 to L4. More specifically, the insulating resin layer 46 is installed between the outer surface 34 of the outer casing 30 and the magnetic sheet 45. In this way, by installing the insulating resin layer 46 between the outer surface 34 of the outer casing 30 and the power receiver coils L1 to L4 it is possible to reduce the chance that the power receiver coils L1 to L4 will touch the outer surface 34 of the outer casing 30, causing a short-circuit or the like of the power receiver coils L1 to L4.

Eighth Embodiment

An eighth embodiment of the present invention differs from the first embodiment in configuration of the contactless rechargeable alkaline secondary battery 1. The configuration of the contactless rechargeable alkaline secondary battery 1 according to the eighth embodiment will be described below with reference to FIGS. 15 and 16.

Components in common with the first embodiment are denoted by the same reference numerals as the corresponding components of the first embodiment, and detailed description thereof will be omitted.

Figure 15A:
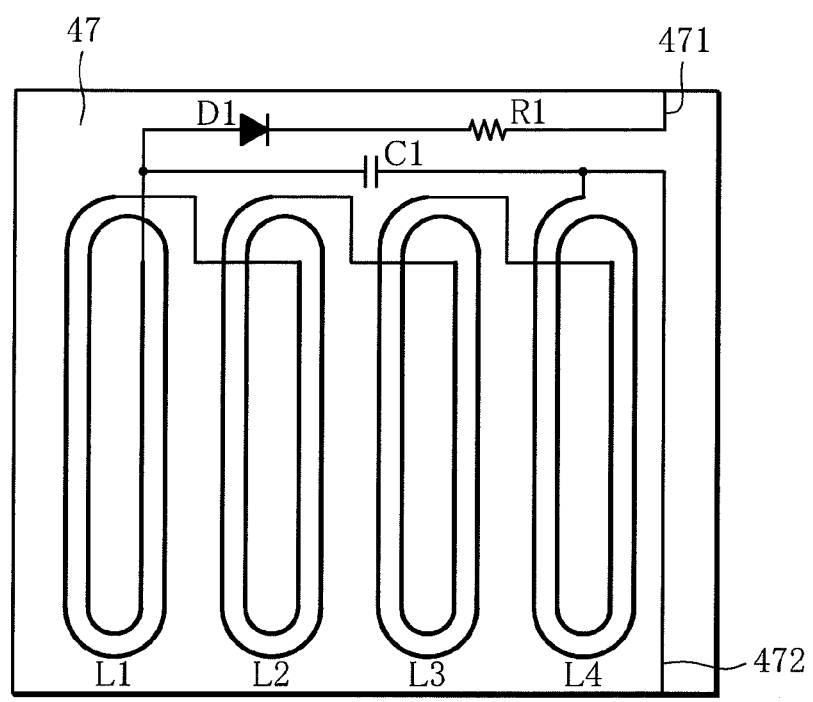
FIG. 15A is an exploded front view illustrating a structure of a contactless rechargeable alkaline secondary battery according to an eighth embodiment.
Figure 15B:
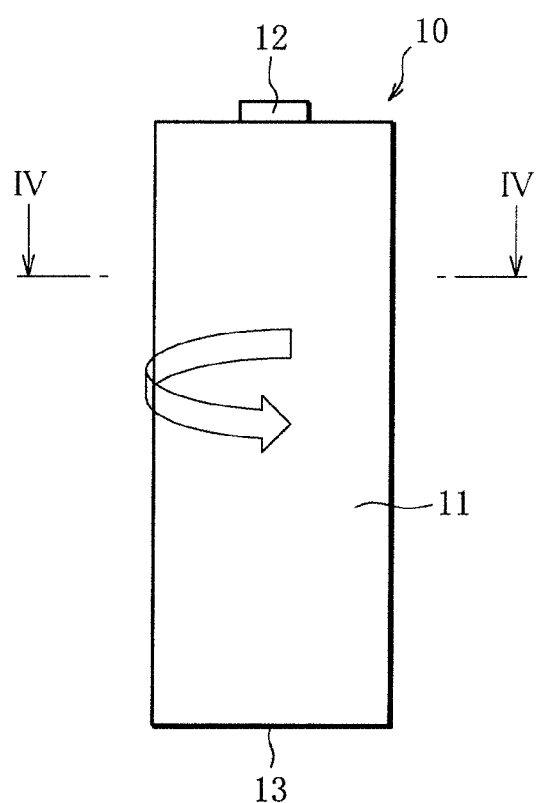
FIG. 15B is an exploded front view illustrating the structure of the contactless rechargeable alkaline secondary battery according to the eighth embodiment.
Figure 16:
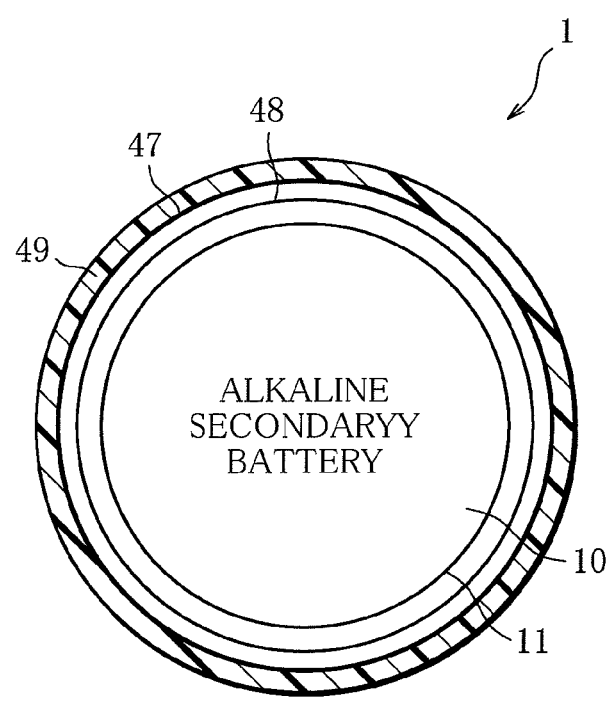
FIG. 16 is a sectional view of the contactless rechargeable alkaline secondary battery according to the eighth embodiment taken along line IV-IV.

FIGS. 15A and 15B are exploded front views illustrating a structure of the contactless rechargeable alkaline secondary battery 1 according to the eighth embodiment. FIG. 16 is a sectional view of the contactless rechargeable alkaline secondary battery 1 according to the eighth embodiment, illustrating a IV-IV section of FIG. 15.

The contactless rechargeable alkaline secondary battery 1 according to the eighth embodiment includes the alkaline secondary battery 10, the power receiver circuit 21, the rectifier circuit 22, the current limiter circuit 23, a flexible printed circuit board (FPC: Flexible Printed Circuits) 47, magnetic sheet 48, and an insulating resin film 49. The power receiver circuit 21, rectifier circuit 22, and current limiter circuit 23 have the same configurations as in the first embodiment.

Except for a difference in size, the alkaline secondary battery 10 according to the eighth embodiment has the same configuration as the alkaline secondary battery 10 according to the first embodiment. The alkaline secondary battery 10 according to the eighth embodiment is identical in shape and size with a so-called AA dry battery (code R6 of IEC60086). The contactless rechargeable alkaline secondary battery 1 according to the eighth embodiment includes the AA alkaline secondary battery 10, flexible printed circuit board 47, magnetic sheet 48, and insulating resin film 49. The power receiver coils L1 to L4 of the power receiver circuit 21, the resonance capacitor C1, the rectifier diode D1 of the rectifier circuit 22, and the current limiting resistor R1 of the current limiter circuit 23 are installed on the flexible printed circuit board 47. In the above configuration, the power receiver coils L1 to L4 are installed next to one another in the circumferential direction along the outer surface 11 of the alkaline secondary battery 10. The magnetic sheet 48 is produced, for example, by forming a resin with powder of ferrite, an amorphous or other metallic magnetic substance, sintered ferrite, or the like scattered thereon into a sheet.

More specifically, the resonance capacitor C1, rectifier diode D1, and current limiting resistor R1 are mounted as surface mount devices (SMDs) on the flexible printed circuit board 47 on which the power receiver coils L1 to L4 and wiring patterns have been formed by etching, a printing technique, or the like. Regarding dimensions, the flexible printed circuit board 47 and magnetic sheet 48 have widths substantially equal to a height of the alkaline secondary battery 10, and have lengths substantially equal to an outer length of the alkaline secondary battery 10. The magnetic sheet 48 is wound around the outer surface 11 of the alkaline secondary battery 10. The flexible printed circuit board 47 is wound on an outer side of the magnetic sheet 48. The insulating resin film 49 covers an outer side of the flexible printed circuit board 47. The flexible printed circuit board 47 and magnetic sheet 48 may be wound around the alkaline secondary battery 10 after being integrated with the insulating resin film 49. A positive terminal 471 and negative terminal 472 of the flexible printed circuit board 47 are connected to the positive pole 12 and negative pole 13 of the alkaline secondary battery 10, respectively (not shown).

Note that preferably the magnetic sheet 48 is installed in order to reduce losses caused to the power receiver coils L1 to L4 by an eddy current produced on the outer surface 11 of the alkaline secondary battery 10 although the magnetic sheet 48 is not an indispensable element of the present invention.

A large number of the contactless rechargeable alkaline secondary batteries 1 configured as described above can be charged simultaneously in a contactless manner by simply being left lying down casually on the placement surface 51 of the contactless battery charger 2 without concern for their orientation and position, as with the first embodiment (FIG. 5). That is, as with the first embodiment, the present embodiment enables easy handling at the time of charging, thereby making it possible to achieve high convenience by taking full advantage of contactless charging. Thus, as with the first embodiment, the present embodiment makes it possible to implement a more convenient contactless rechargeable alkaline secondary battery 1 and contactless battery charger 2. Furthermore, the contactless rechargeable alkaline secondary battery 1 of the above-described configuration can be produced by an extremely plain and simple process. That is, the eighth embodiment of the present invention has technical significance especially in being able to produce the contactless rechargeable alkaline secondary battery 1 at extremely low cost.

Ninth Embodiment

A ninth embodiment of the present invention differs from the first embodiment in circuit configuration of the contactless rechargeable alkaline secondary battery 1. The circuit configuration of the contactless rechargeable alkaline secondary battery 1 according to the ninth embodiment will be described below with reference to FIG. 17.

Components in common with the first embodiment are denoted by the same reference numerals as the corresponding components of the first embodiment, and detailed description thereof will be omitted.

Figure 17:
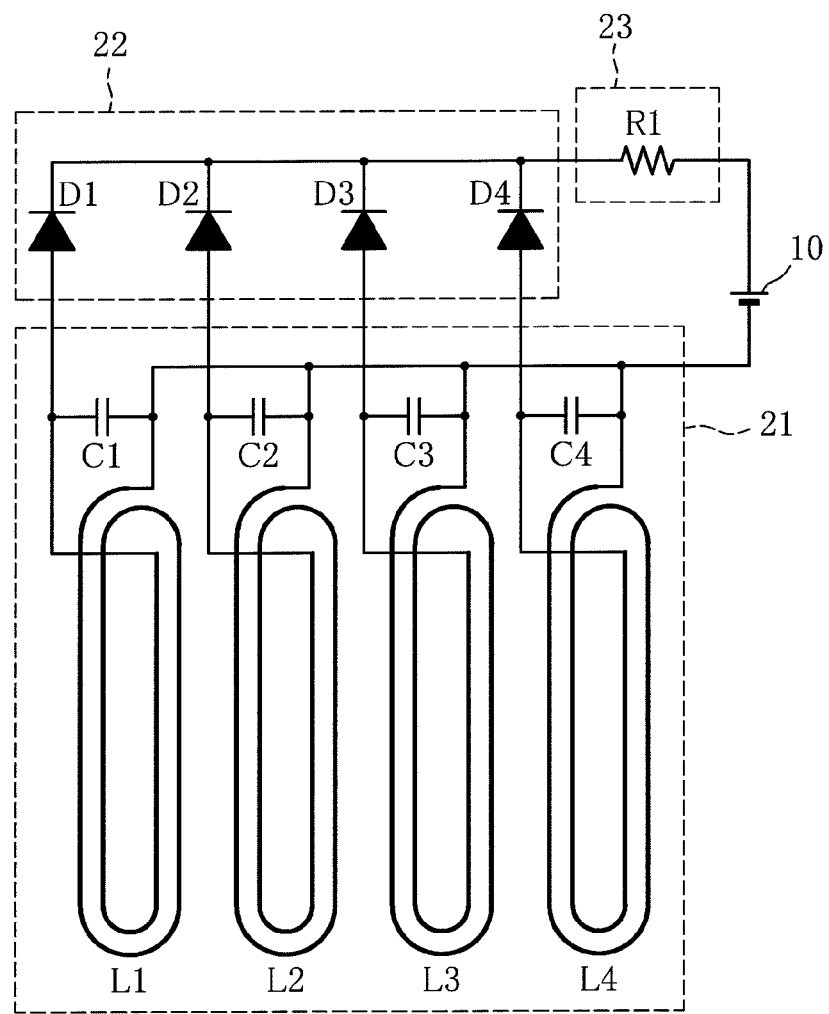
FIG. 17 is a circuit diagram of a contactless rechargeable alkaline secondary battery according to ninth and eleventh embodiments.

FIG. 17 is a circuit diagram of the contactless rechargeable alkaline secondary battery 1 according to the ninth embodiment.

The power receiver circuit 21 according to the ninth embodiment includes four power receiver coils L1 to L4 and four resonance capacitors C1 to C4, where the four power receiver coils L1 to L4 and four resonance capacitors C1 to C4 are connected, respectively, in parallel with each other, forming four resonance circuits. The rectifier circuit 22 according to the ninth embodiment includes four rectifier diodes D1 to D4 corresponding to the four resonance circuits of the power receiver circuit 21, respectively. The four resonance circuits of the power receiver circuit 21 are connected in parallel with the alkaline secondary battery 10 through the rectifier diodes D1 to D4 and current limiting resistor R1.

More specifically, the power receiver coil L1 and resonance capacitor C1 are connected in parallel, forming a resonance circuit. The power receiver coil L2 and resonance capacitor C2 are connected in parallel, forming a resonance circuit. The power receiver coil L3 and resonance capacitor C3 are connected in parallel, forming a resonance circuit. The power receiver coil L4 and resonance capacitor C4 are connected in parallel, forming a resonance circuit.

The resonance capacitor C1 is connected at one end to an anode of the rectifier diode D1, and at another end to the negative pole 13 of the alkaline secondary battery 10. The resonance capacitor C2 is connected at one end to an anode of the rectifier diode D2, and at another end to the negative pole 13 of the alkaline secondary battery 10. The resonance capacitor C3 is connected at one end to an anode of the rectifier diode D3, and at another end to the negative pole 13 of the alkaline secondary battery 10. The resonance capacitor C4 is connected at one end to an anode of the rectifier diode D4, and at another end to the negative pole 13 of the alkaline secondary battery 10. Cathodes of the rectifier diodes D1 to D4 are connected to one end of the current limiting resistor R1. Another end of the current limiting resistor R1 is connected to the positive pole 12 of the alkaline secondary battery 10.

In the contactless rechargeable alkaline secondary battery 1 configured as described above, the alkaline secondary battery 10 is charged by the resonance circuit with the highest incoming voltage of the four resonance circuits in the power receiver circuit 21. Also, since the four power receiver coils L1 to L4 are installed next to one another in the circumferential direction of the outer casing 30, regardless of what part of the outer surface of the contactless rechargeable alkaline secondary battery 1 faces the power transmission coil L11, any of the four power receiver coils L1 to L4 will face the power transmission coil L11. Therefore, regardless of what part of the outer surface faces the power transmission coil L11, the contactless rechargeable alkaline secondary battery 1 can always undergo contactless charging with power transmission efficiency equal to or higher than a predetermined level.

Also, since four independent resonance circuits are connected in parallel, making up the power receiver circuit 21, even if the power receiver coil L1 is broken or the like, electric power can be received by any of the other power receiver coils L2 to L4, making it possible to improve the durability of the contactless rechargeable alkaline secondary battery 1.

Tenth Embodiment

A tenth embodiment of the present invention differs from the ninth embodiment in circuit configuration of the contactless rechargeable alkaline secondary battery 1. The circuit configuration of the contactless rechargeable alkaline secondary battery 1 according to the tenth embodiment will be described below with reference to FIG. 18.

Components in common with the ninth embodiment are denoted by the same reference numerals as the corresponding components of the ninth embodiment, and detailed description thereof will be omitted.

Figure 18:
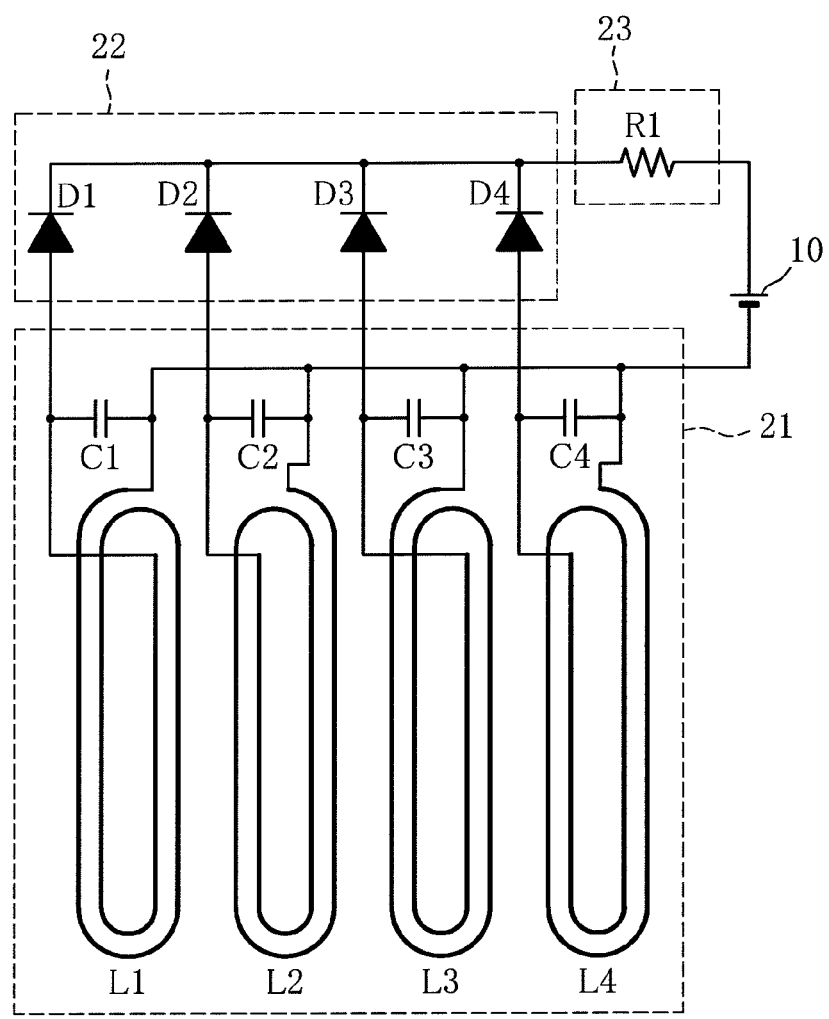
FIG. 18 is a circuit diagram of a contactless rechargeable alkaline secondary battery according to a tenth embodiment.

FIG. 18 is a circuit diagram of the contactless rechargeable alkaline secondary battery 1 according to the tenth embodiment.

Circuit configuration of the power receiver circuit 21 according to the tenth embodiment is similar to that of the ninth embodiment in that the power receiver coils L1 to L4 and resonance capacitors C1 to C4 are connected, respectively, in parallel with each other, forming four resonance circuits. On the other hand, the power receiver circuit 21 according to the tenth embodiment differs from that of the ninth embodiment in that the power receiver coils L1 and L3 are wound in the normal direction while the power receiver coils L2 and L4 are wound in the reverse direction.

That is, the power receiver circuit 21 according to the tenth embodiment includes a resonance circuit made up of the power receiver coils L1 and L3 wound in the normal direction and a resonance circuit made up of the power receiver coils L2 and L4 wound in the reverse direction. Consequently, the positive voltage component of the AC power transmitted from the contactless battery charger 2 is received by the resonance circuit made up of the power receiver coils L1 and L3 wound in the normal direction while the negative voltage component is received by the resonance circuit made up of the power receiver coils L2 and L4 wound in the reverse direction. That is, without the need to install a full-wave rectifier circuit, the tenth embodiment makes it possible to receive the negative voltage component of the AC power transmitted from the contactless battery charger 2 as well without throwing away the negative voltage component wastefully. This makes it possible to further improve power transmission efficiency.

Eleventh Embodiment

An eleventh embodiment of the present invention differs from the ninth embodiment in circuit configuration of the contactless rechargeable alkaline secondary battery 1. The circuit configuration of the contactless rechargeable alkaline secondary battery 1 according to the eleventh embodiment will be described below with reference to FIG. 17.

Components in common with the ninth embodiment are denoted by the same reference numerals as the corresponding components of the ninth embodiment, and detailed description thereof will be omitted.

Circuit configuration of the power receiver circuit 21 according to the eleventh embodiment is similar to that of the ninth embodiment in that the power receiver coils L1 to L4 and resonance capacitors C1 to C4 are connected, respectively, in parallel with each other, forming four resonance circuits. On the other hand, the power receiver circuit 21 according to the eleventh embodiment differs from that of the ninth embodiment in that the four resonance circuits differ in resonance frequency.

More specifically, resonance frequency f1 of a resonance circuit made up of the power receiver coil L1 and resonance capacitor C1 is set to be different from resonance frequency f2 of a resonance circuit made up of the power receiver coil L2 adjacent to the power receiver coil L1 and the resonance capacitor C2 as well as from resonance frequency f4 of a resonance circuit made up of the power receiver coil L4 adjacent to the power receiver coil L1 and the resonance capacitor C4. Similarly, resonance frequency f3 of a resonance circuit made up of the power receiver coil L3 and resonance capacitor C3 is set to be different from the resonance frequency f2 of the resonance circuit made up of the power receiver coil L2 adjacent to the power receiver coil L3 and the resonance capacitor C2 as well as from the resonance frequency f4 of the resonance circuit made up of the power receiver coil L4 adjacent to the power receiver coil L3 and the resonance capacitor C4.

The resonance frequency f1 and resonance frequency f3 may be the same or different. Similarly, the resonance frequency f2 and resonance frequency f4 may be the same or different.

The contactless rechargeable alkaline secondary battery 1 configured as described above, allows the range of resonance frequency in the power receiver circuit 21 to be expanded within the range of f1 to f4, making it possible to mitigate reductions in power transmission efficiency caused by a difference in resonance frequency from the power transmission circuit 61 of the contactless battery charger 2. This in turn makes it possible to implement a contactless rechargeable alkaline secondary battery 1 flexibly compatible with various types of contactless battery chargers 2 which differ in resonance frequency. Furthermore, it is also possible to flexibly accommodate fluctuations of the resonance frequency due to temperature characteristics or aging of circuit elements of the power receiver circuit 21 or power transmission circuit 61.

Twelfth Embodiment

A twelfth embodiment of the present invention differs from the ninth embodiment in circuit configuration of the contactless rechargeable alkaline secondary battery 1. The circuit configuration of the contactless rechargeable alkaline secondary battery 1 according to the twelfth embodiment will be described below with reference to FIG. 19.

Components in common with the ninth embodiment are denoted by the same reference numerals as the corresponding components of the ninth embodiment, and detailed description thereof will be omitted.

Figure 19:
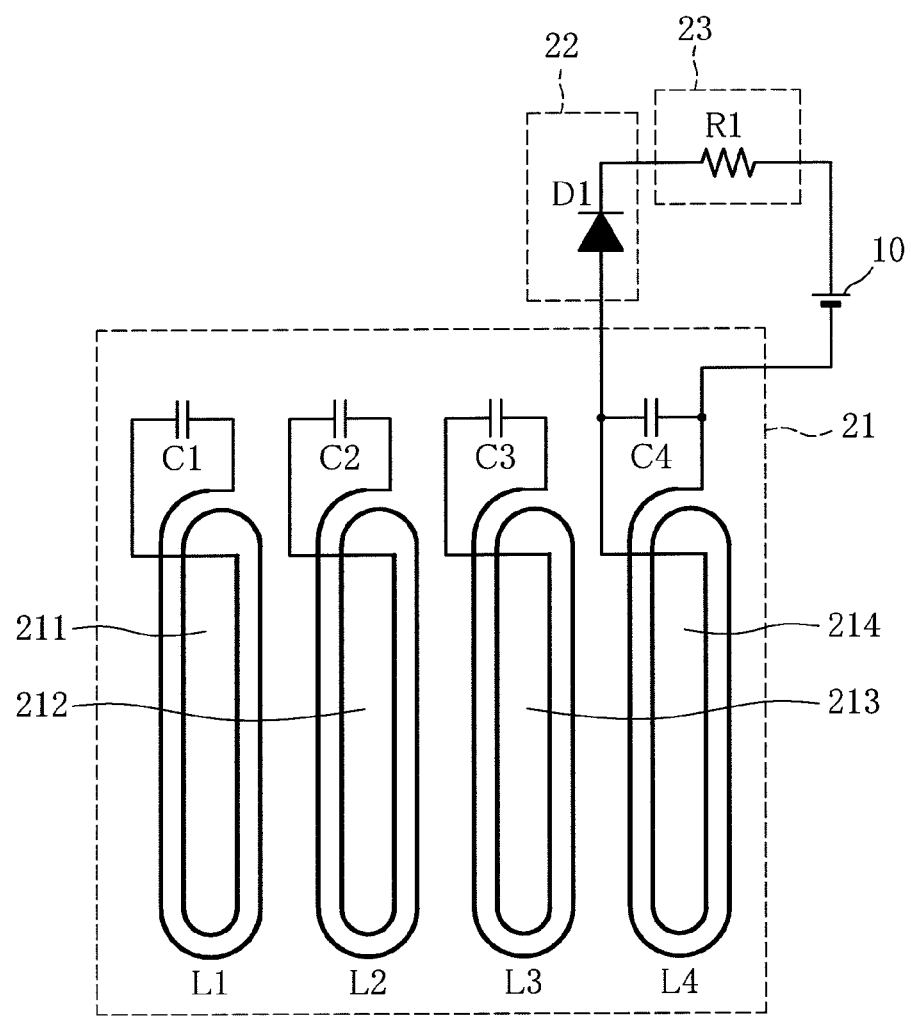
FIG. 19 is a circuit diagram of a contactless rechargeable alkaline secondary battery according to a twelfth embodiment.

FIG. 19 is a circuit diagram of the contactless rechargeable alkaline secondary battery 1 according to the twelfth embodiment.

Circuit configuration of the power receiver circuit 21 according to the twelfth embodiment is similar to that of the ninth embodiment in that the power receiver coils L1 to L4 and resonance capacitors C1 to C4 are connected, respectively, in parallel with each other, forming four resonance circuits. On the other hand, the power receiver circuit 21 according to the twelfth embodiment differs from that of the ninth embodiment in the following points.

Of the four resonance circuits, only a first resonance circuit 214 made up of the power receiver coil L4 and resonance capacitor C4 is connected to the rectifier circuit 22 (rectifier diode D1). On the other hand, second resonance circuits 211 to 213 made up of the power receiver coil L1 and resonance capacitor C1, the power receiver coil L2 and resonance capacitor C2, and the power receiver coil L3 and resonance capacitor C3, respectively, are connected to the rectifier circuit 22 via other resonance circuits by magnetic coupling between the resonance circuits.

More specifically, the resonance capacitors C1 to C3 are not connected to the rectifier diode D1. On the other hand, the resonance capacitor C4 is connected at one end to the anode of the rectifier diode D1, and at another end to the negative pole 13 of the alkaline secondary battery 10. The cathode of the rectifier diode D1 is connected to one end of the current limiting resistor R1. The other end of the current limiting resistor R1 is connected to the positive pole 12 of the alkaline secondary battery 10.

In the contactless rechargeable alkaline secondary battery 1 configured as described above, since the plurality of independent resonance circuits are magnetically coupled to one another, making up the power receiver circuit 21, for example, if the second resonance circuit 212 has the highest incoming voltage, incoming power of the second resonance circuit 212 is transmitted to the other second resonance circuits 211 and 213 by magnetic coupling between the resonance circuits, and further to the first resonance circuit 214 to charge the alkaline secondary battery 10 through the rectifier circuit 22. Also, since the four power receiver coils L1 to L4 are installed next to one another in the circumferential direction of the outer casing 30, regardless of what part of the outer surface of the contactless rechargeable alkaline secondary battery 1 faces the power transmission coil L11, any of the four power receiver coils L1 to L4 will face the power transmission coil L11. Therefore, regardless of what part of the outer surface of the contactless rechargeable alkaline secondary battery 1 faces the power transmission coil L11, the contactless rechargeable alkaline secondary battery 1 can always undergo contactless charging with power transmission efficiency equal to or higher than a predetermined level.

Furthermore, in the contactless rechargeable alkaline secondary battery 1 of the above-described configuration, since the power receiver circuit 21 includes the first resonance circuit 214 connected to the rectifier circuit 22 and the second resonance circuits 211 to 213 connected to the rectifier circuit 22 via other resonance circuits by magnetic coupling between the resonance circuits, even if, for example, the power receiver coil L1 is broken or the like, electric power can be received by any of the other power receiver coils L2 to L4, making it possible to improve the durability of the contactless rechargeable alkaline secondary battery 1. Also, the contactless rechargeable alkaline secondary battery 1 of the above-described configuration can reduce the manufacturing costs by reducing the number of parts of the rectifier circuit 22.

In the power receiver circuit 21 according to the twelfth embodiment, preferably the resonance frequencies f1 to f3 of the second resonance circuits 211 to 213 differ from the resonance frequency f4 of the first resonance circuit 214 within a range of a full width at half maximum of the resonance frequency f4 of the first resonance circuit 214. This allows the range of resonance frequency in the power receiver circuit 21 to be expanded while limiting reductions in power transmission efficiency caused by a difference in resonance frequency from the power transmission circuit 61 of the contactless battery charger 2 to half or less a maximum value. This makes it possible to implement a contactless rechargeable alkaline secondary battery 1 flexibly compatible with various types of contactless battery chargers 2 which differ in resonance frequency while maintaining power transmission efficiency equal to or higher than a predetermined level. Furthermore, it is also possible to flexibly accommodate fluctuations of the resonance frequency due to temperature characteristics or aging of circuit elements of the power receiver circuit 21 or power transmission circuit 61.

Thirteenth Embodiment

A thirteenth embodiment of the present invention differs from the first embodiment in circuit configuration of the contactless rechargeable alkaline secondary battery 1. The circuit configuration of the contactless rechargeable alkaline secondary battery 1 according to the thirteenth embodiment will be described below with reference to FIG. 20.

Components in common with the first embodiment are denoted by the same reference numerals as the corresponding components of the first embodiment, and detailed description thereof will be omitted.

Figure 20:
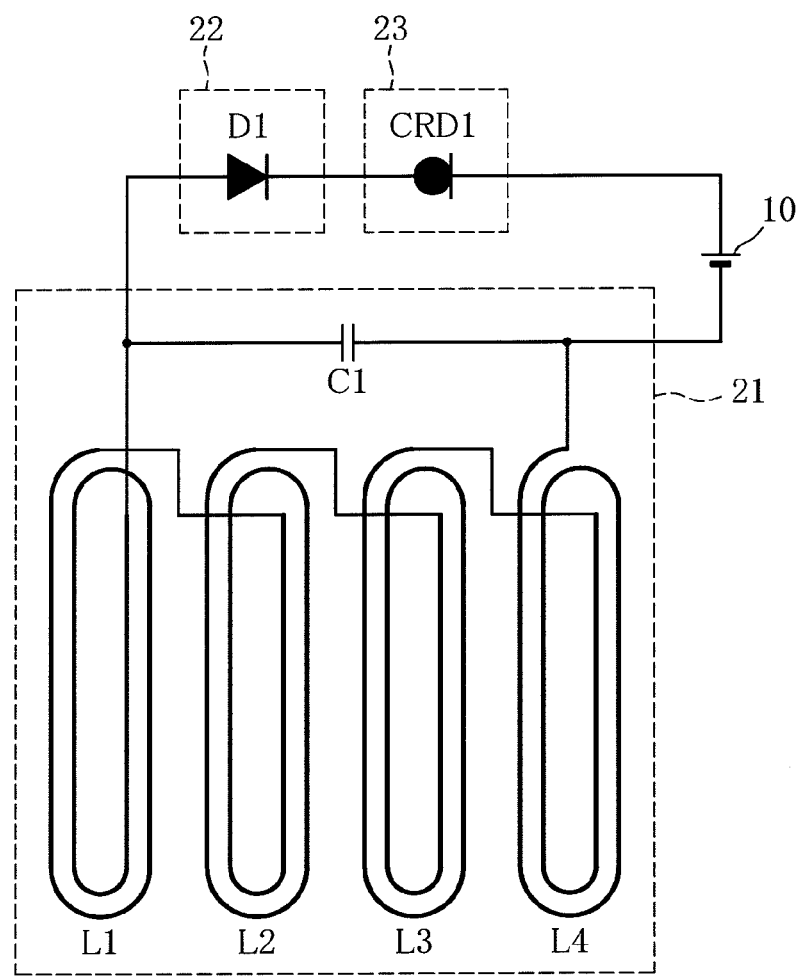
FIG. 20 is a circuit diagram of a contactless rechargeable alkaline secondary battery according to a thirteenth embodiment.

FIG. 20 is a circuit diagram of the contactless rechargeable alkaline secondary battery 1 according to the thirteenth embodiment.

The current limiter circuit 23 according to the thirteenth embodiment differs from that of the first embodiment in being made up of a constant current diode CRD1 as a "constant current circuit." More specifically, the constant current diode CRD1 has its anode connected to the cathode of the rectifier diode D1, and its cathode connected to the positive pole 12 of the alkaline secondary battery 10. In this way, since the current limiter circuit 23 is made up of the constant current diode CRD1, it is possible to further reduce the chance that the alkaline secondary battery 10 will be charged by overcurrent.

Fourteenth Embodiment

A fourteenth embodiment of the present invention differs from the first embodiment in circuit configuration of the contactless rechargeable alkaline secondary battery 1. The circuit configuration of the contactless rechargeable alkaline secondary battery 1 according to the fourteenth embodiment will be described below with reference to FIG. 21.

Components in common with the first embodiment are denoted by the same reference numerals as the corresponding components of the first embodiment, and detailed description thereof will be omitted.

Figure 21:
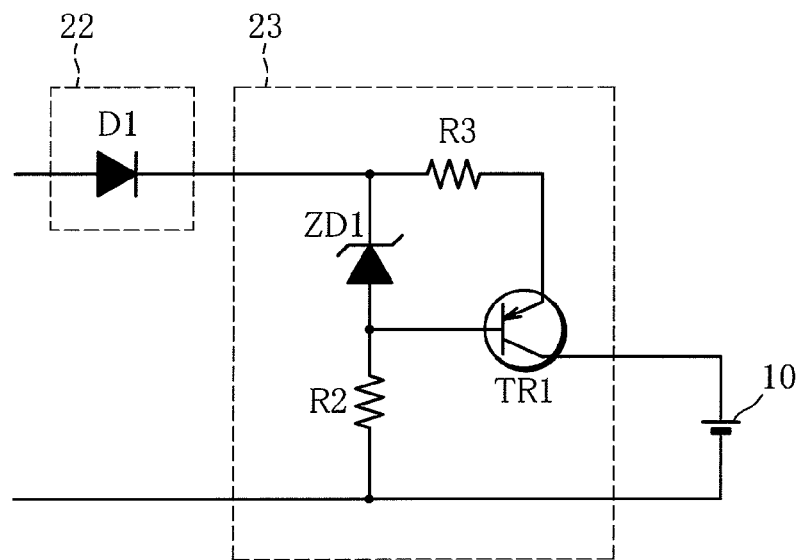
FIG. 21 is a circuit diagram of a contactless rechargeable alkaline secondary battery according to a fourteenth embodiment.

FIG. 21 is a circuit diagram of the contactless rechargeable alkaline secondary battery 1 according to the fourteenth embodiment.

The current limiter circuit 23 according to the fourteenth embodiment differs from that of the first embodiment in being a constant current circuit made up of a transistor TR1, a Zener diode ZD1, and resistors R2 and R3.

The transistor TR1 is a PNP bipolar transistor. A cathode of the Zener diode ZD1 is connected to one end of the resistor R3, and a connection point therebetween is connected to the cathode of the rectifier diode D1. Another end of the resistor R3 is connected to an emitter of the transistor TR1. An anode of the Zener diode ZD1 is connected to a base of the transistor TR1, and a connection point therebetween is connected to one end of the resistor R2. Another end of the resistor R2 is connected to the negative pole 13 of the alkaline secondary battery 10. A collector of the transistor TR1 is connected to the positive pole 12 of the alkaline secondary battery 10.

In a known constant current circuit of such a configuration, a base voltage of the transistor TR1 is kept constant by the Zener diode ZD1. Consequently, a collector current of the transistor TR1, i.e., a charging current of the alkaline secondary battery 10 is kept to or below a fixed current value even if an output voltage of rectifier circuit 22 fluctuates. This makes it possible to further reduce the chance that the alkaline secondary battery 10 will be charged by overcurrent.

Fifteenth Embodiment

A fifteenth embodiment of the present invention differs from the first embodiment in circuit configuration of the contactless rechargeable alkaline secondary battery 1. The circuit configuration of the contactless rechargeable alkaline secondary battery 1 according to the fifteenth embodiment will be described below with reference to FIG. 22.

Components in common with the first embodiment are denoted by the same reference numerals as the corresponding components of the first embodiment, and detailed description thereof will be omitted.

Figure 22:
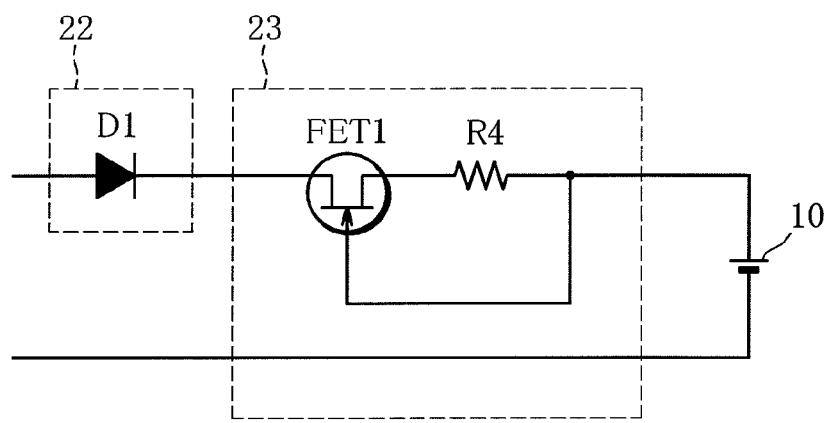
FIG. 22 is a circuit diagram of a contactless rechargeable alkaline secondary battery according to a fifteenth embodiment.

FIG. 22 is a circuit diagram of the contactless rechargeable alkaline secondary battery 1 according to the fifteenth embodiment.

The current limiter circuit 23 according to the fifteenth embodiment differs from that of the first embodiment in being a constant current circuit made up of a field effect transistor FET1 and a resistor R4.

The field effect transistor FET1 is an n-channel junction field effect transistor. The field effect transistor FET1 has its drain connected with the cathode of the rectifier diode D1, its source connected with one end of the resistor R4, and its gate connected with another end of the resistor R4. A connection point between the gate of the field effect transistor FET1 and the other end of the resistor R4 is connected to the positive pole 12 of the alkaline secondary battery 10.

In a known constant current circuit of such a configuration, the source and gate of the field effect transistor FET1 are connected with each other through the resistor R4. Consequently, a drain current of field effect transistor FET1, i.e., a charging current of the alkaline secondary battery 10, is kept to or below a fixed current value by constant current characteristics of the field effect transistor. This makes it possible to further reduce the chance that the alkaline secondary battery 10 will be charged by overcurrent.

Sixteenth Embodiment

A sixteenth embodiment of the present invention differs from the first embodiment in configuration of the contactless battery charger 2. The contactless battery charger 2 according to the sixteenth embodiment of the present invention will be described below with reference to FIG. 23.

Components in common with the first embodiment are denoted by the same reference numerals as the corresponding components of the first embodiment, and detailed description thereof will be omitted.

Figure 23:
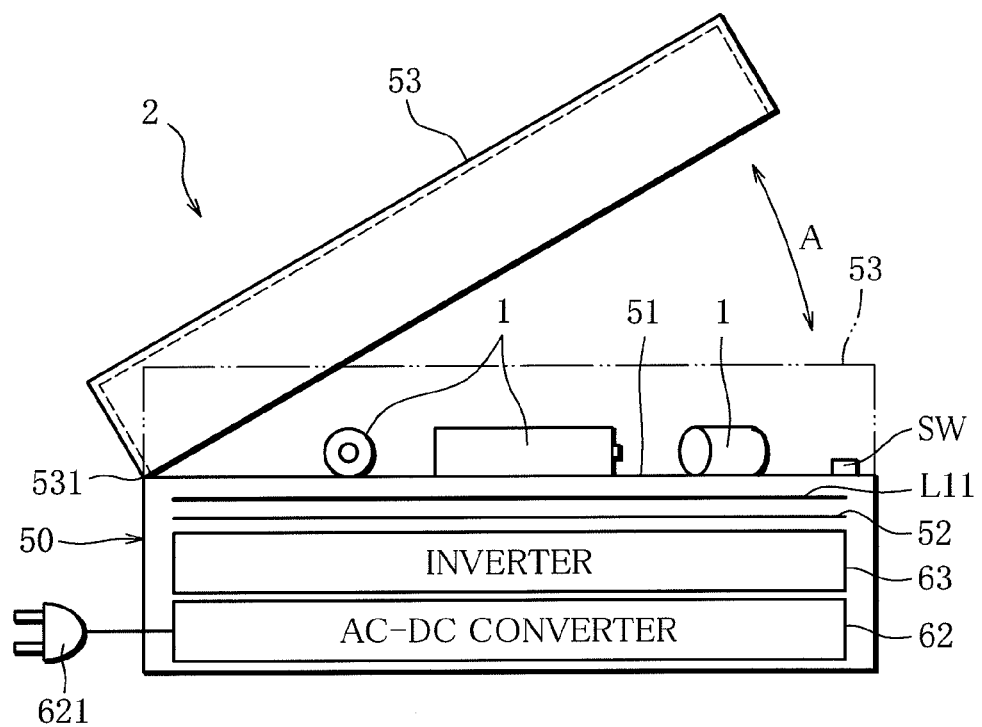
FIG. 23 is a sectional view of a contactless battery charger according to a sixteenth embodiment when viewed from the front.

FIG. 23 is a sectional view of the contactless battery charger 2 according to the sixteenth embodiment when viewed from the front.

Compared to the first embodiment, the contactless battery charger 2 according to the sixteenth embodiment further includes a shielding structure adapted to provide a shield to prevent external leakage of electromagnetic waves emitted from the power transmission circuit 61. More specifically, the contactless battery charger 2 according to the sixteenth embodiment includes a shielding cover 53 openably and closably supported in the direction of symbol A and adapted to cover the placement surface 51 when closed. The shielding cover 53 is a box-shaped member made of electromagnetic shielding material or the like and is pivotally supported by a shaft 531 to the charger body 50.

The switch SW is installed at such a position as to engage with the shielding cover 53 when the shielding cover 53 is closed. That is, the contactless battery charger 2 according to the sixteenth embodiment is configured such that electric power will be supplied from the AC-DC converter 62 to the inverter 63 only when the shielding cover 53 is closed.

The contactless battery charger 2 configured as described above prevents external leakage of electromagnetic waves emitted from the power transmission circuit 61 when the shielding cover 53 is closed. Also, with the contactless battery charger 2 of the above configuration, electromagnetic waves are emitted from the power transmission circuit 61 only when the shielding cover 53 is closed, but are not emitted from the power transmission circuit 61 under other conditions. This makes it possible to reliably prevent external leakage of electromagnetic waves from the contactless battery charger 2 and thereby proactively prevent neighboring electronic devices and human bodes from being affected by electromagnetic leakage from the contactless battery charger 2.

Seventeenth Embodiment

A seventeenth embodiment of the present invention differs from the first embodiment in configuration of the contactless battery charger 2. The contactless battery charger 2 according to the seventeenth embodiment of the present invention will be described below with reference to FIG. 24.

Components in common with the first embodiment are denoted by the same reference numerals as the corresponding components of the first embodiment, and detailed description thereof will be omitted.

Figure 24:
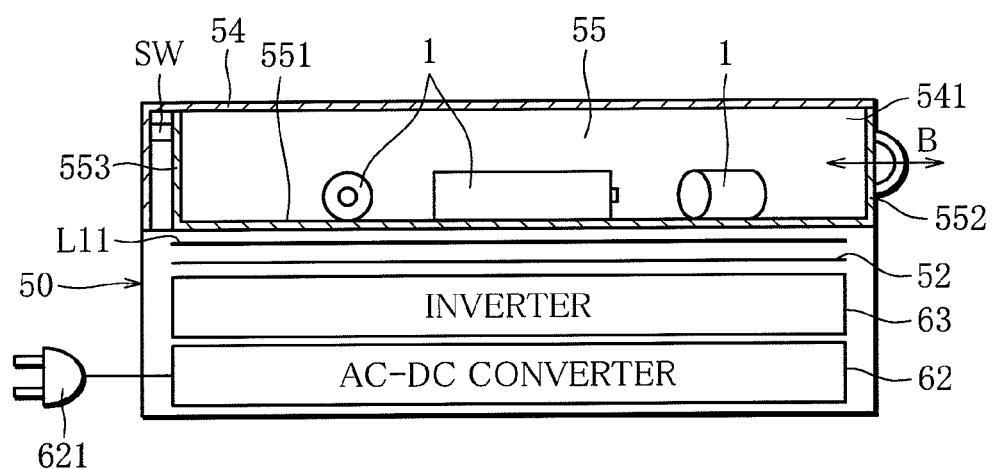
FIG. 24 is a sectional view of a contactless battery charger according to a seventeenth embodiment when viewed from the front.

FIG. 24 is a sectional view of the contactless battery charger 2 according to the seventeenth embodiment when viewed from the front.

Compared to the contactless battery charger 2 according to the first embodiment, the contactless battery charger 2 according to the seventeenth embodiment further includes a shielding structure adapted to provide a shield to prevent external leakage of electromagnetic waves emitted from the power transmission circuit 61. More specifically, compared to the contactless battery charger 2 according to the first embodiment, the contactless battery charger 2 according to the seventeenth embodiment further includes a shielding member 54 adapted to cover a space on a top side of the power transmission coil L11, and a tray 55 able to be housed in a space between the shielding member 54 and power transmission coil L11. A shielding member 54 is made of electromagnetic shielding material or the like and shaped like a box whose front face and bottom face are open. The tray 55 is a box-shaped member whose top face is open, whose inside bottom portion 551 is made of a material transparent to at least electromagnetic waves of the same resonance frequency as the power transmission circuit 61, and whose front face portion 552 is made of electromagnetic shielding material or the like. The tray 55 can be inserted and withdrawn into/from the space between the shielding member 54 and power transmission coil L11 in the direction indicated by symbol B through an opening 541 in the front face of the shielding member 54. When housed in the space between the shielding member 54 and power transmission coil L11, the inside bottom portion 551 of the tray 55 serves as a "placement surface" on which the contactless rechargeable alkaline secondary battery 1 is placed.

The switch SW is installed at such a position as to be abutted by a back face 553 of the tray 55 when the tray 55 is inserted into a predetermined position through the opening 541 of the shielding member 54 and housed in the space between the shielding member 54 and power transmission coil L11. That is, the contactless battery charger 2 according to the seventeenth embodiment is configured such that electric power will be supplied from the AC-DC converter 62 to the inverter 63 only when the tray 55 is inserted into a predetermined position through the opening 541 of the shielding member 54.

The contactless battery charger 2 configured as described above prevents external leakage of electromagnetic waves emitted from the power transmission circuit 61 when the tray 55 is inserted into a predetermined position through the opening 541 of the shielding member 54. Also, with the contactless battery charger 2 of the above configuration, electromagnetic waves are emitted from the power transmission circuit 61 only when the tray 55 is inserted into a predetermined position through the opening 541 of the shielding member 54, but are not emitted from the power transmission circuit 61 under other conditions. This makes it possible to reliably prevent external leakage of electromagnetic waves from the contactless battery charger 2 and thereby proactively prevent neighboring electronic devices and human bodes from being affected by electromagnetic leakage from the contactless battery charger.

REFERENCE SIGNS LIST

1 Contactless rechargeable alkaline secondary battery
2 Contactless battery charger
10 Alkaline secondary battery
20 Circuit board
21 Power receiver circuit
22 Rectifier circuit
23 Current limiter circuit
30 Outer casing
50 Charger body
51 Placement surface
61 Power transmission circuit
62 AC-DC converter
63 Inverter
64 Control device
C1 to C4, C11 Resonance capacitor
L1 to L4 Power receiver coil

The invention claimed is:

1. A contactless rechargeable secondary battery comprising:
   a secondary battery;
   a power receiver circuit provided with a power receiver coil and a resonance capacitor and adapted to receive AC power of resonance frequency via magnetic field resonance, the resonance capacitor being connected in parallel with the power receiver coil;
   a rectifier circuit adapted to rectify the AC power received by the power receiver circuit;
   a current limiter circuit adapted to limit a charging current flowing from the rectifier circuit to the secondary battery; and
   an outer casing configured to be cylindrical in shape, adapted to house the secondary battery, and provided with a positive terminal and a negative terminal, the positive terminal being connected with a positive pole of the secondary battery and the negative terminal being connected with a negative pole of the secondary battery, wherein the power receiver coil is shaped like a sheet, that extends from the negative pole to the positive pole, by being made up of an electric wire wound along a plane and is installed along an inner surface of the outer casing.

2. The contactless rechargeable secondary battery according to claim 1, further comprising a magnetic layer installed between the secondary battery and the power receiver coil.

3. The contactless rechargeable secondary battery according to claim 1, further comprising an insulating layer installed between the secondary battery and the power receiver coil.

4. The contactless rechargeable secondary battery according to claim 1, further comprising an insulating layer installed between the power receiver coil and the inner surface of the outer casing.

5. A contactless rechargeable secondary battery, comprising:
   a secondary battery;
   a power receiver circuit provided with a power receiver coil and a resonance capacitor and adapted to receive AC power of resonance frequency via magnetic field resonance, the resonance capacitor being connected in parallel with the power receiver coil;
   a rectifier circuit adapted to rectify the AC power received by the power receiver circuit;
   a current limiter circuit adapted to limit a charging current flowing from the rectifier circuit to the secondary battery; and
   an outer casing configured to be cylindrical in shape, adapted to house the secondary battery, and provided with a positive terminal and a negative terminal, the positive terminal being connected with a positive pole of the secondary battery and the negative terminal being connected with a negative pole of the secondary battery, wherein the power receiver coil is shaped like a sheet by being made up of an electric wire wound along a plane and is installed along an outer surface, that extends from the negative pole to the positive pole, of the outer casing.

6. The contactless rechargeable secondary battery according to claim 5, further comprising a magnetic layer installed between the outer surface of the outer casing and the power receiver coil.

7. The contactless rechargeable secondary battery according to claim 5, further comprising an insulating layer installed between the outer surface of the outer casing and the power receiver coil.

8. The contactless rechargeable secondary battery according to claim 5, further comprising an insulating layer adapted to cover an outer side of the power receiver coil.

9. A contactless rechargeable secondary battery, comprising:
   a secondary battery cylindrical in shape;
   an insulating layer adapted to cover an outer surface of the secondary battery;
   a power receiver circuit provided with a power receiver coil and a resonance capacitor and adapted to receive AC power of resonance frequency via magnetic field resonance, the power receiver coil being shaped like a sheet by being made up of an electric wire wound along a plane, that extends from a negative pole to a positive pole, and the resonance capacitor being connected in parallel with the power receiver coil;
   a rectifier circuit adapted to rectify the AC power received by the power receiver circuit; and
   a current limiter circuit adapted to limit a charging current flowing from the rectifier circuit to the secondary battery, wherein the power receiver circuit, the rectifier circuit, and the current limiter circuit are installed between the outer surface of the secondary battery and the insulating layer.

10. The contactless rechargeable secondary battery according to claim 9, further comprising a magnetic layer installed between the outer surface of the secondary battery and the power receiver coil.

11. The contactless rechargeable secondary battery according to claim 1, wherein a center of gravity is eccentric to an axis of the outer casing.

12. The contactless rechargeable secondary battery according to claim 1, wherein the rectifier circuit is a half-wave rectifier circuit.

13. The contactless rechargeable secondary battery according to claim 1, wherein the current limiter circuit includes a constant current circuit.

14. The contactless rechargeable secondary battery according to claim 1, wherein a quality factor of the resonance of the power receiver circuit is 100 or less.

15. The contactless rechargeable secondary battery according to claim 1, wherein the power receiver circuit has a plurality of the power receiver coils which are installed next to one another in a circumferential direction of the outer casing.

16. The contactless rechargeable secondary battery according to claim 15, wherein the power receiver circuit is configured such that the resonance capacitor is connected in parallel with the plurality of power receiver coils connected in series.

17. The contactless rechargeable secondary battery according to claim 15, wherein the power receiver circuit includes a plurality of resonance circuits in which the power receiver coil and the resonance capacitor are connected in parallel; a plurality of the rectifier circuits are installed for the plurality of resonance circuits, respectively; and outputs from the plurality of rectifier circuits are connected in parallel with one another.

18. The contactless rechargeable secondary battery according to claim 17, wherein the plurality of resonance circuits include a resonance circuit in which the power receiver coil is wound in a normal direction and a resonance circuit in which the power receiver coil is wound in a reverse direction.

19. The contactless rechargeable secondary battery according to claim 17, wherein the plurality of resonance circuits differ in resonance frequency from the resonance circuits adjacent to the power receiver coil.

20. The contactless rechargeable secondary battery according to claim 15, wherein the power receiver circuit includes a plurality of resonance circuits in which the power receiver coil and the resonance capacitor are connected in parallel; and the plurality of resonance circuits include a first resonance circuit connected to the rectifier circuit and second resonance circuits connected to the rectifier circuit via other resonance circuits by magnetic coupling between the resonance circuits.

21. The contactless rechargeable secondary battery according to claim 20, wherein the resonance frequency of the second resonance circuits differs from the resonance frequency of the first resonance circuit within a range of a full width at half maximum of the resonance frequency of the first resonance circuit.

22. A contactless battery charger, comprising:
a power supply circuit adapted to output AC power of resonance frequency;
a power transmission circuit provided with a power transmission coil and a resonance capacitor and adapted to transmit the AC power of the resonance frequency via magnetic field resonance, the resonance capacitor being connected in parallel with the power transmission coil;
a shielding structure adapted to provide a shield to prevent external leakage of electromagnetic waves emitted from the power transmission circuit;
a switch adapted to open and close a route of AC power supply from the power supply circuit to the power transmission circuit by engaging with the shielding structure such that the AC power is supplied from the power supply circuit to the power transmission circuit with a shield against the electromagnetic waves from the power transmission circuit being provided by the shielding structure; and
a placement surface on which a contactless rechargeable secondary battery is placed in order for the power transmission coil to emit electromagnetic waves, wherein the power transmission coil is installed parallel to the placement surface, and is shaped like a sheet by being made up of an electric wire wound along a plane.

23. The contactless battery charger according to claim 22, further comprising a magnetic layer installed between the power transmission coil and the power supply circuit.

24. The contactless battery charger according to claim 22, further comprising a control device adapted to control the power supply circuit such that electric power is transmitted intermittently from the power transmission circuit.

25. The contactless battery charger according to claim 22, wherein the shielding structure includes a shielding cover openably and closably supported and adapted to cover the placement surface when closed; and the switch opens with the shielding cover closed and with surroundings of the placement surface being shielded.

26. The contactless battery charger according to claim 22, wherein the shielding structure includes an insertable/withdrawable tray whose inside bottom surface serves as the placement surface; and the switch opens with the tray being inserted into a predetermined position, shielding surroundings of the inside bottom surface of the tray.

* * * * *